(12) United States Patent
Smith et al.

(10) Patent No.: US 7,620,019 B1
(45) Date of Patent: Nov. 17, 2009

(54) SPACE DIVISION MULTIPLE ACCESS SCHEDULING

(75) Inventors: Martin Smith, Chelmsford (GB); Keith Wilson, Bishops Stortford (GB); John Hudson, Stansted (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 685 days.

(21) Appl. No.: 10/928,454

(22) Filed: Aug. 27, 2004

(51) Int. Cl.
*H04W 4/00* (2006.01)
*H04B 7/212* (2006.01)
*G05B 13/02* (2006.01)

(52) U.S. Cl. .......................... 370/334; 370/347; 700/53

(58) Field of Classification Search .................. 700/53; 370/334, 347; 455/561, 562.1
See application file for complete search history.

(56) References Cited

U.S. PATENT DOCUMENTS

| | | | | |
|---|---|---|---|---|
| 5,634,199 | A * | 5/1997 | Gerlach et al. | 455/63.1 |
| 6,836,674 | B2 * | 12/2004 | Taniguchi et al. | 455/562.1 |
| 2003/0204378 | A1 * | 10/2003 | Cai | 702/189 |
| 2003/1020437 | * | 10/2003 | Cai | 702/189 |
| 2004/0235421 | A1 * | 11/2004 | Matsuoka et al. | 455/63.4 |
| 2005/0286663 | A1 * | 12/2005 | Poon | 375/347 |

OTHER PUBLICATIONS

J H Conway, R H Hardin, Nja Sloane, "Packing Lines, Planes, etc.: Packings in Grassmannian Spaces" Experimental Mathematics, vol. 5 (1996), 139-159.

D J Love, R W Heath, T Strohmer. "Grassmannian Beamforming for Multiple-Input Multiple-Output Wireless Systems", IEEE Trans. On Information Theory 49 (10), Oct. 2003, pp. 2735-2747.

KK Mukkavilli, A Sabharwal, E Erkip, B Aazhang, "On Beamforming with Finite Rate Feedback in Multiple Antenna Systems" IEEE Transactions on Information Theory, 49 (10) Oct. 2003, pp. 2562-2579.

D Agrawal, T J Richardson, R Urbanke, "Multiple-Antenna Signal Constellations for Fading Channels" IEEE Trans. On Information Theory 47 (6), Sep. 2001, pp. 2618-2626.

P Viswanath, D C Tse, R Laroia, "Opportunistic Beamforming Using Dumb Antennas" IEEE Transactions of Information Theory, vol. 48, No. 6, Jun. 2002, pp. 1277-1294.

T L Marzetta, B M Hochwald, "Capacity of a Mobile Multiple-Antenna Communication Link in Rayleigh Flat Fading" IEEE Trans. On Information Theory 45 (1), Jan. 1999, pp. 139-157.

G Caire and S Shamai "On the Multiple-Antenna Broadcast Channel" 36th Asilomar Conf. on Signals, Systems and Computers, Nov. 3-6, 2001.

(Continued)

*Primary Examiner*—Nick Corsaro
*Assistant Examiner*—Shannon R Brooks
(74) *Attorney, Agent, or Firm*—Trop Pruner & Hu, P.C.

(57) ABSTRACT

Space division multiple access scheduling for a transmitter having an antenna array with multiple beams includes determining, and storing at the transmitter, angles of arrival of signals and identifiers from user equipments, such as cellular telephones. The user equipment identifiers are sorted at the transmitter in order of angle of arrival to form an ordered list. The ordered list is subdivided into ordered sub-lists of user equipment identifiers in order of angle of arrival. The transmitter sequentially transmits simultaneously to a group of each respective ordinal member of each sub-list of user equipments, which are well-spaced.

23 Claims, 13 Drawing Sheets

OTHER PUBLICATIONS

G Caire and S Shamai "On the Achievable Throughput of a Multi-Antenna Gaussian Broadcast Channel", IEEE Trans. On Inform. Theory, vol. 49, No. 7, pp. 1691-1706, Jul. 2003.

D Tse, P Viswanath and L Zheng "Diversity-Multiplexing Tradeoff in Multiple Access Channels" submitted to IEEE Transactions on Information Theory, Nov. 2003.

* cited by examiner

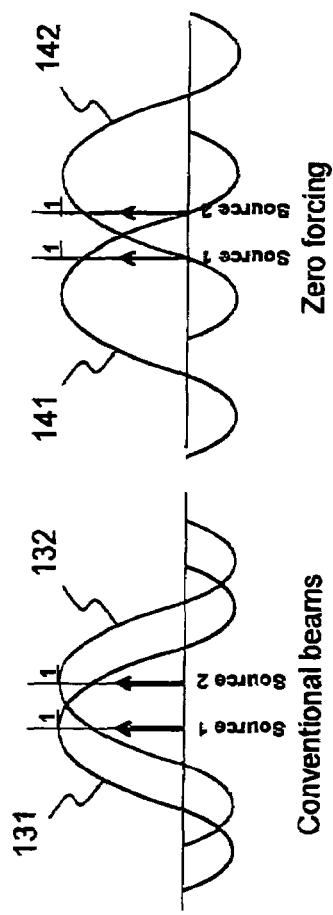
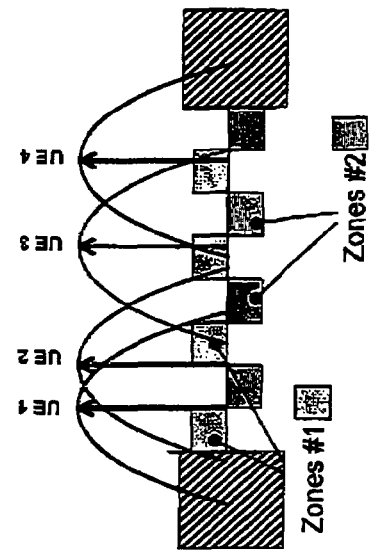
Prior Art
Figure 14
Prior Art
Figure 13
Figure 15

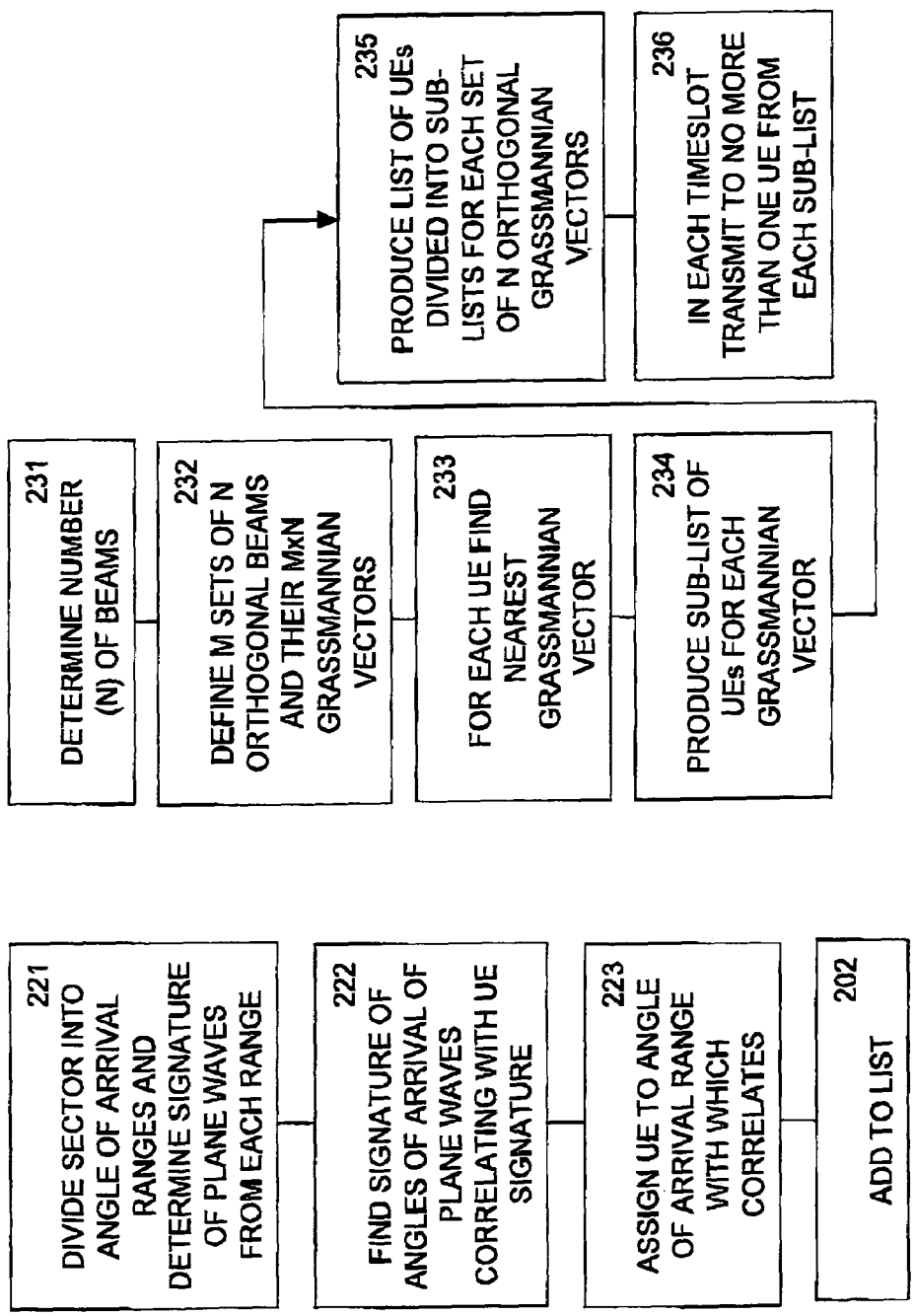

SPACE DIVISION MULTIPLE ACCESS SCHEDULING

FIELD OF THE INVENTION

This invention relates to communication systems, and in particular to space division multiple access scheduling for cellular communication systems.

BACKGROUND OF THE INVENTION

Adaptive or steered beam downlink antennas are known for capacity enhancement of cellular communication systems. A space division multiple access (SDMA) system may use a plurality of individually steered beams within a sector of a cell of a cellular system for communicating simultaneously with a selected plurality of user equipments (UEs), such as cellular phones, in successive timeslots. However, random scheduling of which user equipment to serve in any one timeslot does not maximise system performance because beam overlaps, which cause interference, occur when a base station is communicating with a plurality of UEs subtending a small angle of divergence at the antenna. To improve system performance, and minimise interference, the steered beams need to be kept separated, i.e. to have a minimum overlap. This means that scheduling of which UEs to serve in any one timeslot needs to be carefully tailored, such that all users are served, but in groups of well-spaced members. Searching through the UEs to find a best group, then a second best group, and so on, leaves final selections of UEs that form very poor groups that degrade overall system performance. For example, with a steered beam 10 as shown in FIG. 1, the best choice, which is chosen first, is at the peak of the beam, with UEs 11, 12, 13 separated by 20°. As subsequent choices are made which seek to maintain the 20° separation, the last choice 14, 15, 16 almost inevitably includes two UEs 14, close together close to a border of the sector with an adjoining sector. Similarly, with a fixed multi-beam 20 as shown in FIG. 2, the best choice, 21, 22, 23, which will be chosen first, will be of UEs at the peaks of the multi-beam 20, which are therefore well separated in angle of arrival. However, as a consequence, a last selection will inevitably include user equipments 24, 25, 26 that are at cusps of the multi-beam. However, any alternative approach of searching through all possible groupings to find optimal groups is at present too slow for practical implementation.

SUMMARY OF THE INVENTION

According to a first aspect of the invention, there is provided a method of space division multiple access scheduling comprising the steps of: providing a transmitter having an antenna array with a plurality of beams; determining, and storing at the transmitter, angles of arrival of signals and identifiers from a plurality of user equipments; sorting the identifiers of the user equipments in order of angle of arrival to form an ordered list of user equipments; subdividing the ordered list into a plurality of ordered sub-lists of user equipments in order of angle of arrival; and sequentially transmitting simultaneously on each of the plurality of beams to groups of each respective ordinal member of each sub-list of user equipments, respectively.

Conveniently, the step of sorting the identifiers further comprises determining a carrier to interference and noise ratio for each user equipment; comparing the ratio with one or more predetermined values of the ratio and where the ratio is below one or more of the predetermined values placing the identifier one or more additional times in the ordered list respectively, such that transmissions take place to such user equipments one or more additional times compared with user equipments having ratios above the one or more predetermined values.

Advantageously, the step of determining angles of arrival comprises subdividing a sector addressed by the antenna array into a plurality of contiguous equal angle of arrival ranges and assigning each of the user equipments to an angle of arrival range in which the user equipment angle of arrival most probably lies.

Preferably, the step of assigning each of the user equipments comprises determining a correlation between a spatial signature received at the array from a user equipment and a plurality of plane waves of different angles of arrival and assigning the user equipment to an angle of arrival of a plane wave having a highest correlation with the spatial signature received.

Alternatively, the steps of determining, and storing at the transmitter, angles of arrival of signals and identifiers from a plurality of user equipments comprises assigning sets of substantially orthogonal Grassmannian vectors to the antenna array and vector-quantizing spatial signals received at the array from the plurality of user equipments to a nearest Grassmannian vector; the steps of sorting the identifiers of the user equipments in order of angle of arrival to form an ordered list of user equipments and subdividing the ordered list into a plurality of ordered sub-lists of user equipments in order of angle of arrival comprises forming sub-lists of the identifiers associated with each of the nearest Grassmannian vectors; and the step of sequentially transmitting simultaneously to a group of user equipments comprises simultaneously transmitting to respective ordinal members of sub-lists of user equipments associated with sets of substantially orthogonal Grassmannian vectors.

Preferably, the step of forming sub-lists of the identifiers associated with each of the nearest Grassmannian vectors further comprises determining a carrier to interference and noise ratio for each user equipment; comparing the ratio with one or more predetermined values of the ratio and where the ratio is below one or more of the predetermined values placing the identifier one or more additional times in the sub-list respectively, such that transmissions take place to such user equipments one or more additional times compared with user equipments having ratios above the one or more predetermined values According to a second aspect of the invention, there is provided a space division multiple access scheduling apparatus comprising: receiving means for receiving signals and identifiers from a plurality of user equipments; processing means for determining angles of arrival of the signals received from the second plurality of user equipment; for sorting the identifiers of the user equipments in order of angle of arrival to form an ordered list of user equipments; and for subdividing the ordered list into a plurality of ordered sub-lists of user equipments in order of angle of arrival; and transmitter means having antenna array means for producing a plurality of beams for sequentially transmitting simultaneously on each of the plurality of beams to groups of each respective ordinal member of each sub-list of user equipments, respectively.

Advantageously, the processing means is arranged for determining a carrier to interference and noise ratio for each user equipment; comparing the ratio with one or more predetermined values of the ratio and where the ratio is below one or more of the predetermined values placing the identifier one or more additional times in the ordered list respectively, such that transmissions take place to such user equipments one or more additional times compared with user equipments having ratios above the one or more predetermined values.

Conveniently, the processing means is arranged for subdividing a sector addressed by the antenna array into a plurality of contiguous equal angle of arrival ranges and for assigning each of the user equipments to an angle of arrival range in which the user equipment angle of arrival most probably lies.

Preferably, the processing means comprises correlation means for determining a correlation between a spatial signature received at the array from a user equipment and a plurality of plane waves of different angles of arrival and assigning the user equipment to an angle of arrival of a plane wave having a highest correlation with the spatial signature received.

Alternatively, the processing means is arranged for assigning Grassmannian vectors to the antenna array and vector-quantizing spatial signals received at the array from the plurality of user equipments to a nearest Grassmannian vector to form the sub-lists and the transmitter means is arranged for sequentially transmitting simultaneously to a group comprises simultaneously transmitting to user equipments associated with substantially orthogonal Grassmannian vectors.

Preferably, the processing means is arranged for determining a carrier to interference and noise ratio for each user equipment; comparing the ratio with one or more predetermined values of the ratio and where the ratio is below one or more of the predetermined values placing the identifier one or more additional times in a respective sub-list, such that transmissions take place to such user equipments one or more additional times compared with user equipments having ratios above the one or more predetermined values.

According to a third aspect of the invention, there is provided a space division multiple access scheduling apparatus comprising: a receiver for receiving signals and identifiers from a plurality of user equipments; a processor for determining angles of arrival of the signals received from the plurality of user equipments; for sorting the identifiers of the user equipments in order of angle of arrival to form an ordered list of user equipments; and for subdividing the ordered list into a plurality of ordered sub-lists of user equipments in order of angle of arrival; and a transmitter having an antenna array for producing a plurality of beams for sequentially transmitting simultaneously on each of the plurality of beams to groups of each respective ordinal member of each sub-list of user equipments, respectively.

Advantageously, the processor is arranged for determining a carrier to interference and noise ratio for each user equipment; comparing the ratio with one or more predetermined values of the ratio and where the ratio is below one or more of the predetermined values placing the identifier one or more additional times in the ordered list respectively, such that transmissions take place to such user equipments one or more additional times compared with user equipments having ratios above the one or more predetermined values.

Conveniently, the processor is arranged for subdividing a sector addressed by the antenna array into a plurality of contiguous equal angle of arrival ranges and for assigning each of the user equipments to an angle of arrival range in which the user equipment angle of arrival most probably lies.

Preferably, the processor comprises a correlator for determining a correlation between a spatial signature received at the array from a user equipment and a plurality of plane waves of different angles of arrival and assigning the user equipment to an angle of arrival of a plane wave having a highest correlation with the spatial signature received.

Alternatively, the processor is arranged for assigning Grassmannian vectors to the antenna array and vector-quantizing spatial signals received at the array from the plurality of user equipments to a nearest Grassmannian vector to form the sub-lists and the transmitter is arranged for sequentially transmitting simultaneously to a group comprises simultaneously transmitting to user equipments associated with substantially orthogonal Grassmannian vectors.

Preferably, the processor is arranged for determining a carrier to interference and noise ratio for each user equipment; comparing the ratio with one or more predetermined values of the ratio and where the ratio is below one or more of the predetermined values placing the identifier one or more additional times in a respective sub-list, such that transmissions take place to such user equipments one or more additional times compared with user equipments having ratios above the one or more predetermined values.

According to a fourth aspect of the invention, there is provided a base station comprising a space division multiple access apparatus as described above.

According to a fifth aspect of the invention, there is provided a network comprising a space division multiple access apparatus as described above.

According to a sixth aspect of the invention, there is provided a random transmit beam system comprising optimally packed beams formed by the method described above.

According to a seventh aspect of the invention, there is provided computer executable software code stored on a computer readable medium, the code being for space division multiple access scheduling comprising the steps of: providing a transmitter having an antenna array with a plurality of beams; determining, and storing at the transmitter, angles of arrival of signals and identifiers from a plurality of user equipments; sorting the identifiers of the user equipments in order of angle of arrival to form an ordered list of user equipments; subdividing the ordered list into a plurality of ordered sub-lists of user equipments in order of angle of arrival; and sequentially transmitting simultaneously to each ordinal member of each sub-list of user equipments.

According to an eighth aspect of the invention, there is provided a programmed computer for space division multiple access scheduling comprising the steps of: providing a transmitter having an antenna array with a plurality of beams; determining, and storing at the transmitter, angles of arrival of signals and identifiers from a plurality of user equipments; sorting the identifiers of the user equipments in order of angle of arrival to form an ordered list of user equipments; subdividing the ordered list into a plurality of ordered sub-lists of user equipments in order of angle of arrival; and sequentially transmitting simultaneously to each ordinal member of each sub-list of user equipments.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the accompanying drawings, in which:

FIG. 13 is an illustration of poor spatial differentiation using conventional beams for SDMA, useful in understanding the invention;

FIG. 14 is an illustration of the poor spatial differentiation of FIG. 13, with zero forcing;

FIG. 15 is an illustration of the selection of UEs from alternating zones;

FIG. 22 is a flowchart of some steps of a third embodiment of the method of the invention; and FIG. 23 is a flowchart of some steps of a fourth embodiment of the method of the invention.

DETAILED DESCRIPTION OF PREFERRED EMBODIMENTS

Figure 1:
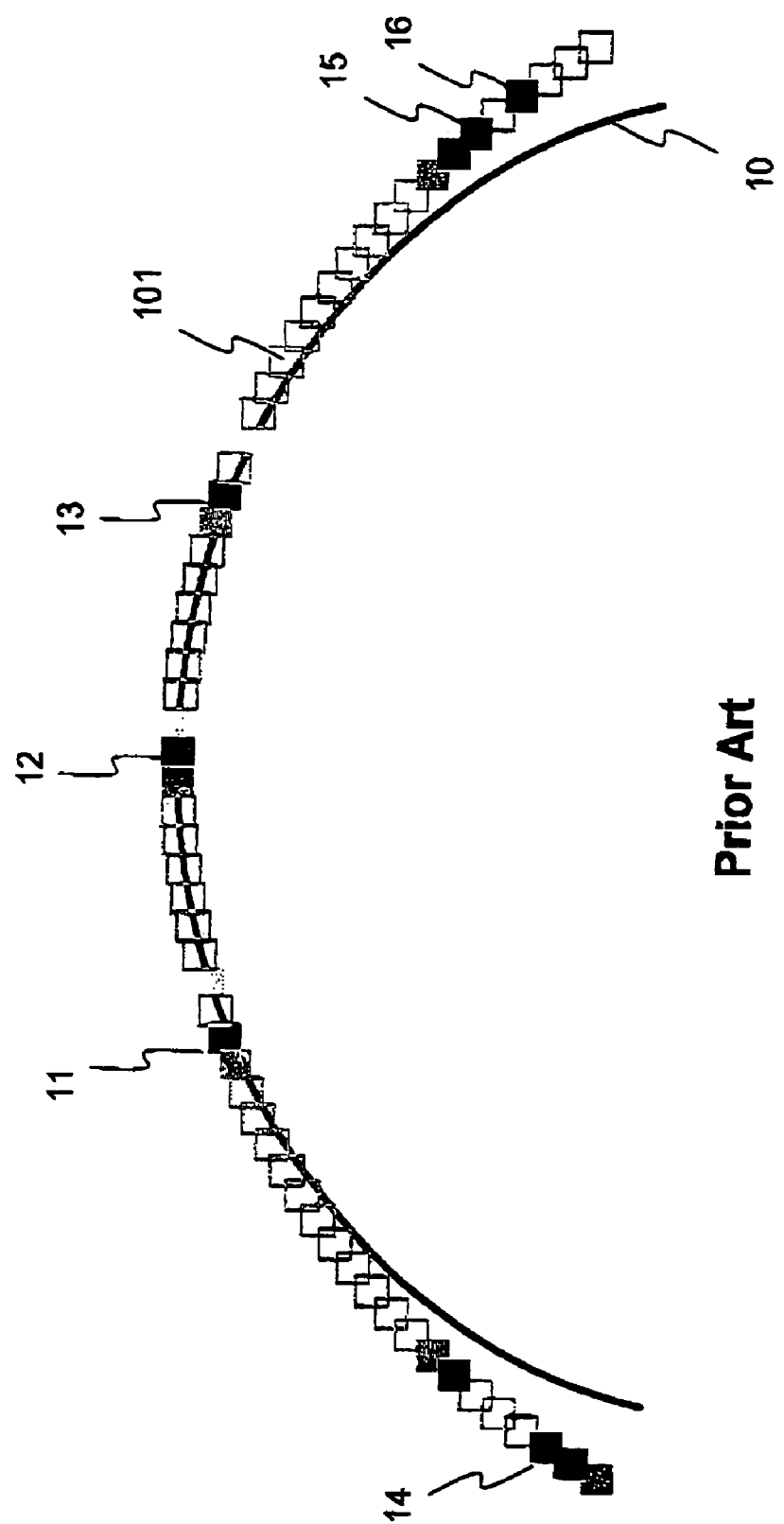
FIG. 1 illustrates a known scheduling method for a steered beam.
Figure 2:
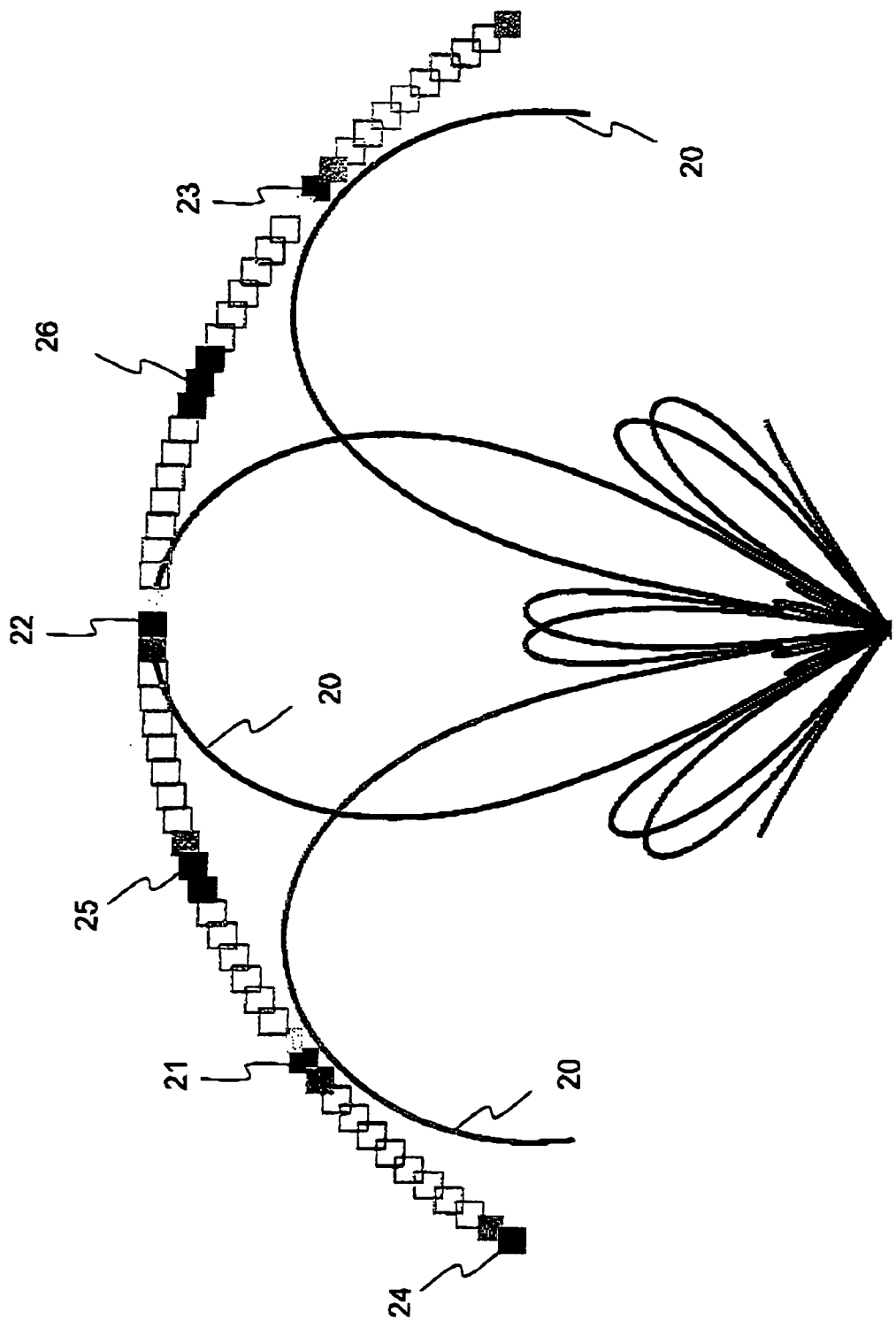
FIG. 2 illustrates the known scheduling method of FIG. 1, for a fixed multi-beam.

Throughout the description, identical reference numerals are used to identify like parts.

Figure 3:
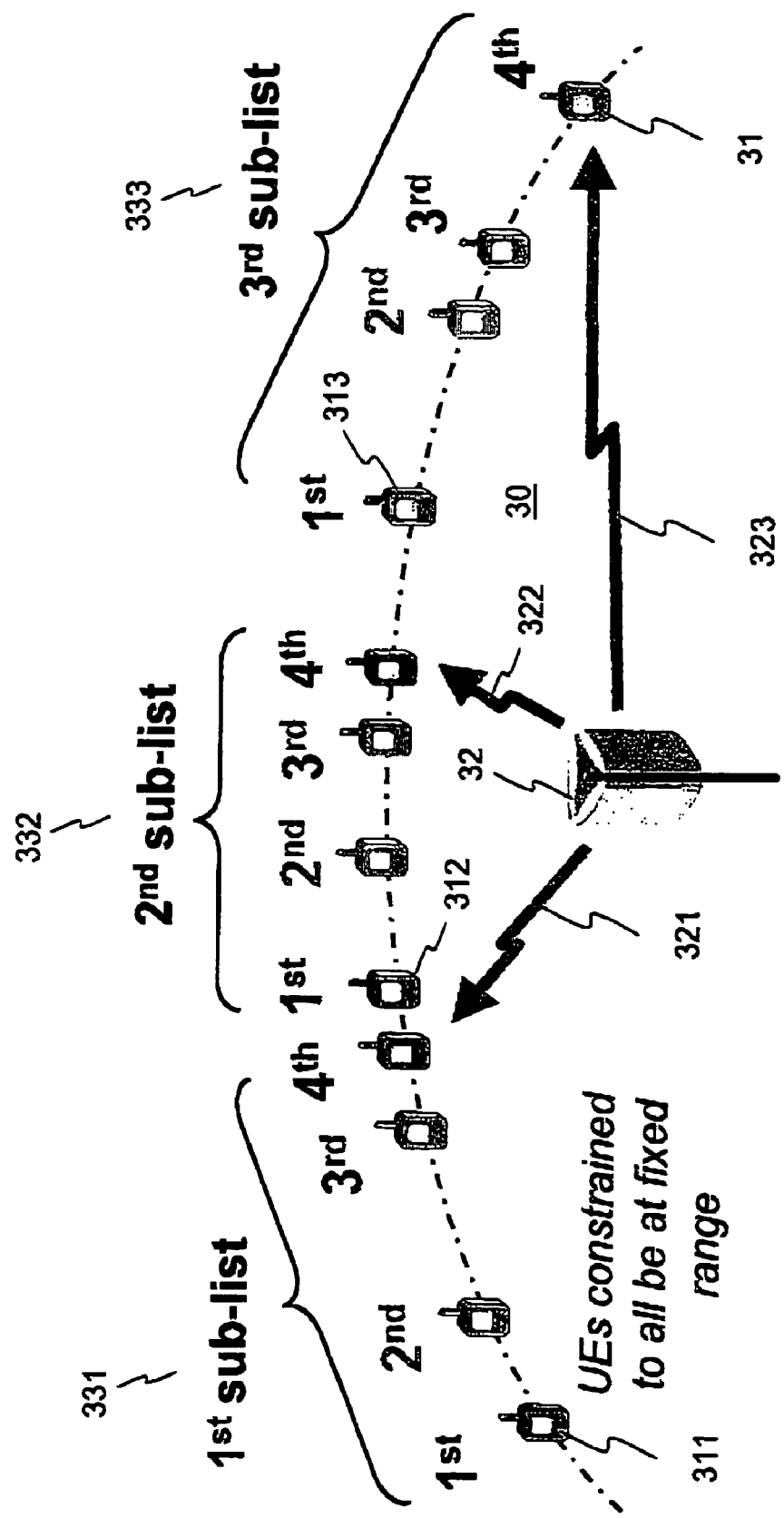
FIG. 3 illustrates a scheduling method according to a first embodiment of the invention.
Figure 20:
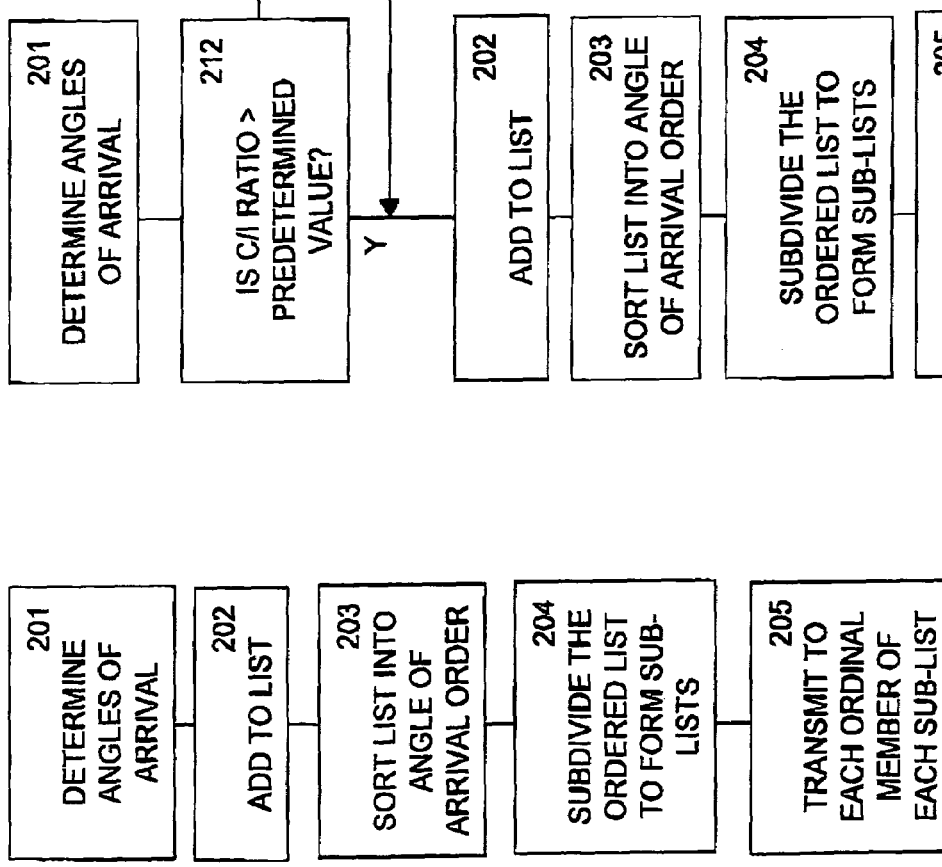
FIG. 20 is a flowchart of a first embodiment of the method of the invention.

Referring to FIGS. 3 and 20, a sector 30 of a cell contains a plurality of cellular phones or user equipments (UEs) 31 in communication with an antenna 32 at a base station. The base station antenna 32 communicates in a given timeslot with selected ones of the UEs 31 using three individually steered beams 321, 322, 323. The base station receives signals from the cellular phones 31 from which angles of arrival are determined, step 201 FIG. 20. The angles of arrival are stored, step 202, at the base station and identifiers of the UEs 31 sorted, step 203, into angle of arrival order across the sector to form an ordered list. The ordered list is sub-divided, step 204, into three ordered sub-lists corresponding with the three beams 321, 322, 323, that is, with the first third of the UEs in order in the first sub-list, the second third of the UEs in order in the second sub-list and the remaining UEs in order in the third sub-list. Then every $n^{th}$ UE, e.g. each first member 311, 312, 313 from each of the ordered lists 331, 332, 333 is selected to form an SDMA group to which the three beams 321, 322, 323 transmit simultaneously, step 205.

Figure 5:
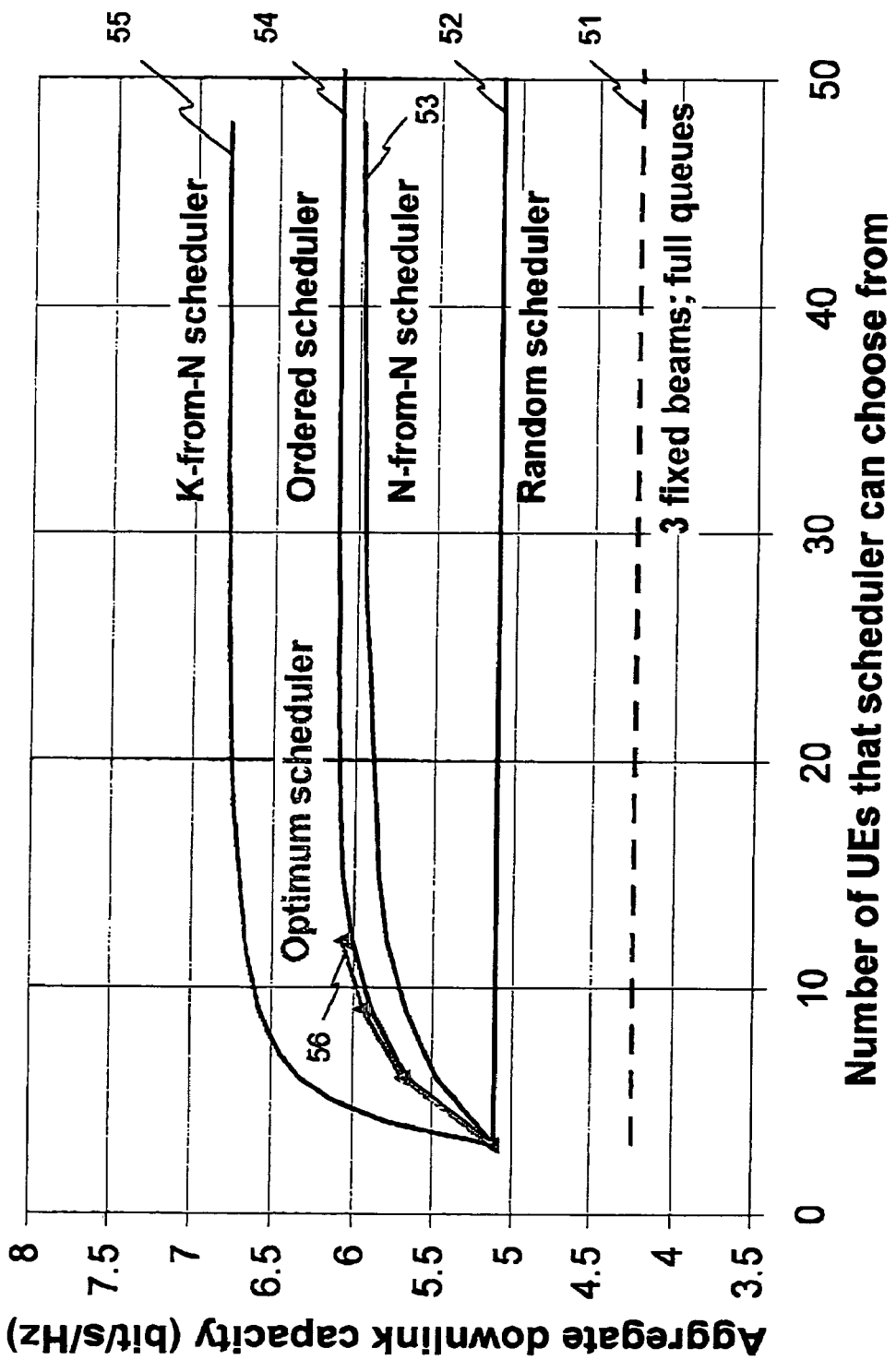
FIG. 5 is a plot of aggregate downlink capacity versus a number of UEs that a scheduler can choose from, comparing results of the scheduling method of the invention with known scheduling methods for three beams.
Figure 6:
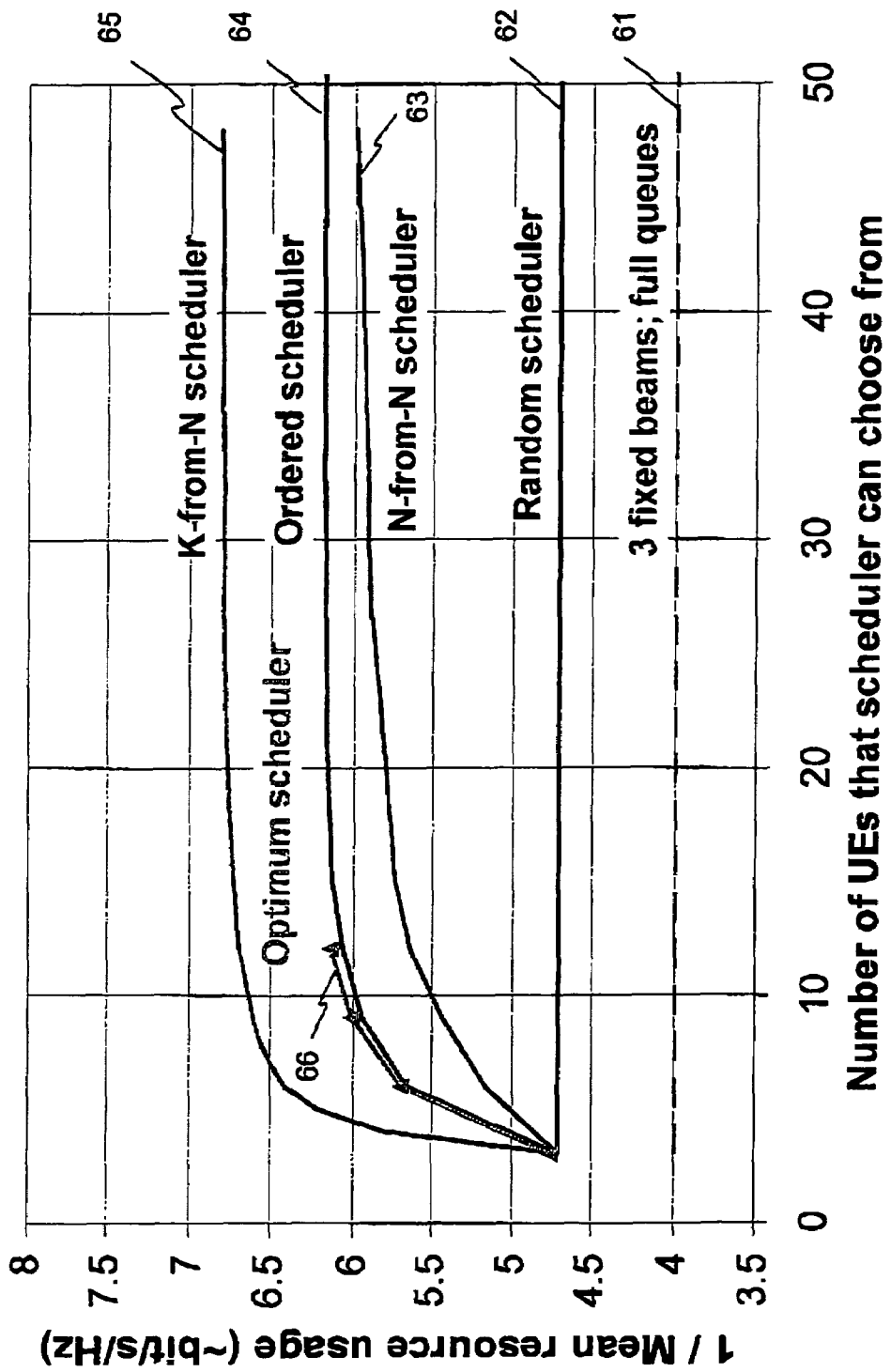
FIG. 6 is a plot of reciprocal mean resource usage (equal throughput capacity) versus a number of UEs that a scheduler can choose from, comparing results of the scheduling method of the invention with known scheduling methods for three beams.

In theory, with a finite number of UEs 31 per sector, this does not guarantee that spacing between the beams 321, 322, 323 will be greater than a predetermined minimum, but in practice a too-close spacing is found to be very unlikely. This initial method has been shown, at least for small numbers of UEs, to be very close to an optimum found by an exhaustive search to find the best SDMA groups, see FIGS. 5 to 7, discussed below.

Figure 4:
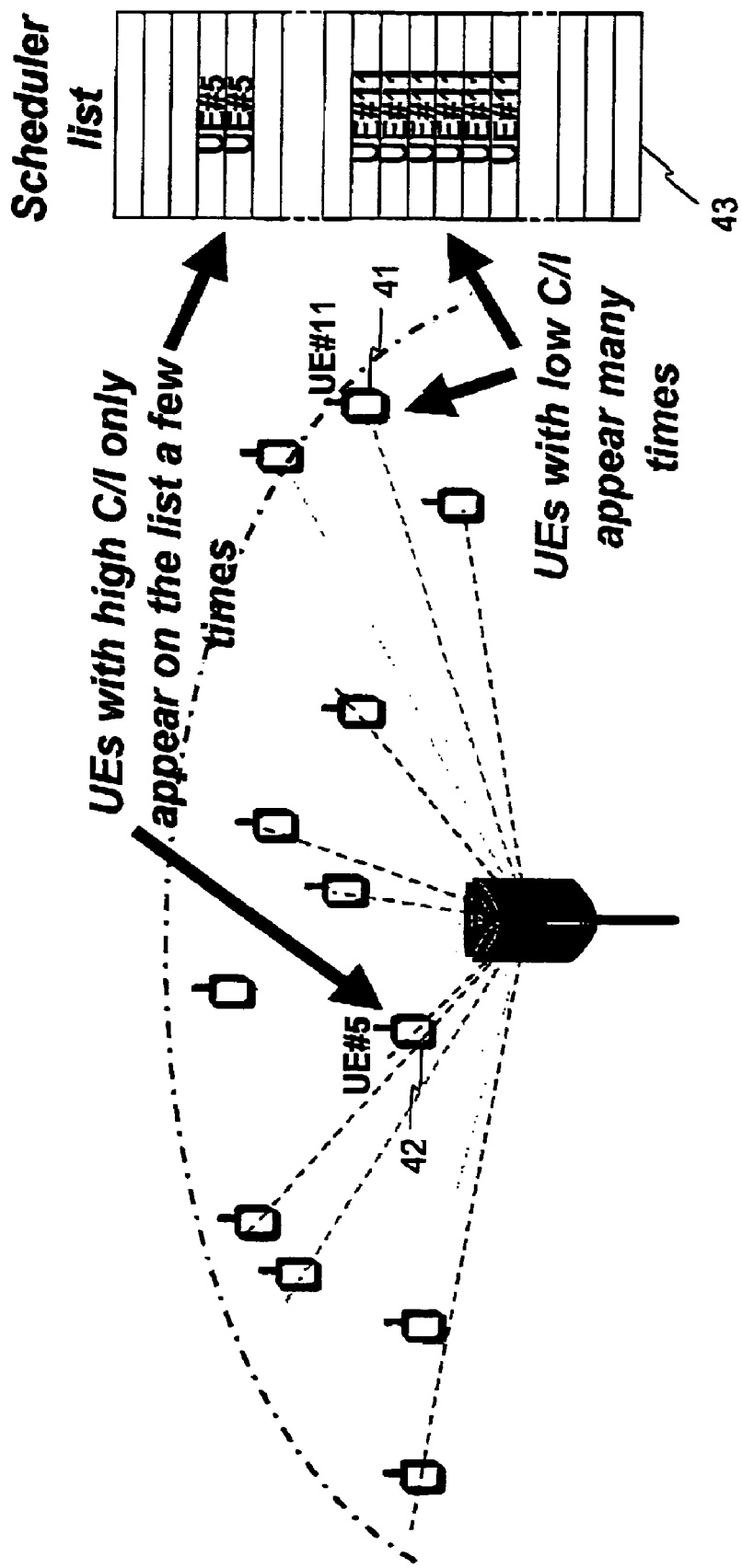
FIG. 4 illustrates a scheduling method according to a second embodiment of the invention.
Figure 21:
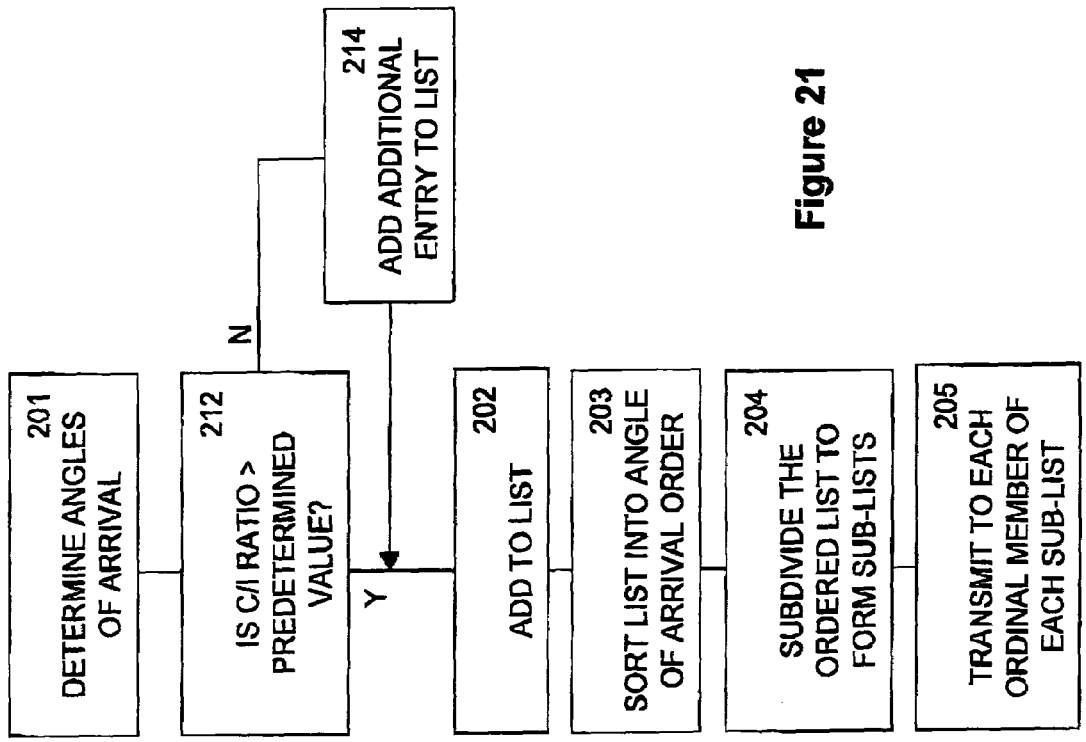
FIG. 21 is a flowchart of a second embodiment of the method of the invention.

This initial approach does not take account of different data rates available to each UE 31, for example because of different carrier to interference (C/I) ratios or carrier to interference and noise ratios. However, in another embodiment, as shown in FIGS. 4 and 21, to accommodate different data rates, UEs 41 with relatively low C/I are consecutively entered in the ordered list 43 more than once so that those UEs 41 with low C/I ratios receive communications more often, in each cycle of the list, than UEs 42 with relatively high C/I ratios. That is, following the step of determining angles of arrival, step 201, there is an additional step of determining, step 212, FIG. 21, whether the C/I ratio exceeds predetermined values. If not, as well as adding, step 202, a standard entry in the list for that user equipment, one or more additional entries are added, step 214, dependent on the C/I ratio, to the list before sorting, step 203. In this manner, more equal data throughput can be provided more fairly to all UEs with which the antenna communicates in the sector, in that the lower the C/I ratio the more times the UE appears in the list Results of simulations of the invention compared with known approaches are shown for three beams in FIGS. 5 and 6, in which aggregate downlink capacity in bit/s/Hz and the reciprocal of mean resource usage in bit/s/Hz, both versus number of UEs that a scheduler can choose from, are plotted respectively. It is apparent from the respective plots 51, 61 that using three fixed beams with full queues results in the lowest capacity. An improvement is achieved by using SDMA with random scheduling in a known method, plots 52, 62, and the capacity is substantially independent of the number of UEs that the scheduler can choose from. Seeking to choose the best groups first, i.e. N-from-N scheduling, as shown in plots 53, 63, results in higher capacity than random scheduling, with increasing benefits up to 30 UEs that the scheduler can chose from and then a substantially constant improvement over random scheduling above 30 UEs. Ordered scheduling, according to the invention, as shown in plots 54, 64, results in an improvement over N-from-N scheduling for all numbers of UEs shown up to 50 UEs. Moreover, at least for numbers of UEs up to about 12 UEs, which is the limit of feasible computation, the ordered scheduling according to the invention approaches the optimum performance obtained by computing every possible combination of selections of UEs, as shown in plots 56, 66. The K-from-N scheduler, plots 55, 65, represents communication with only a selection of user equipments within the sector and ignoring of other user equipments, and is not practically feasible where a service has to be provided to all user equipments in the sector, and does not meet the criteria of equal data throughput to all UEs in the sector.

Figure 7:
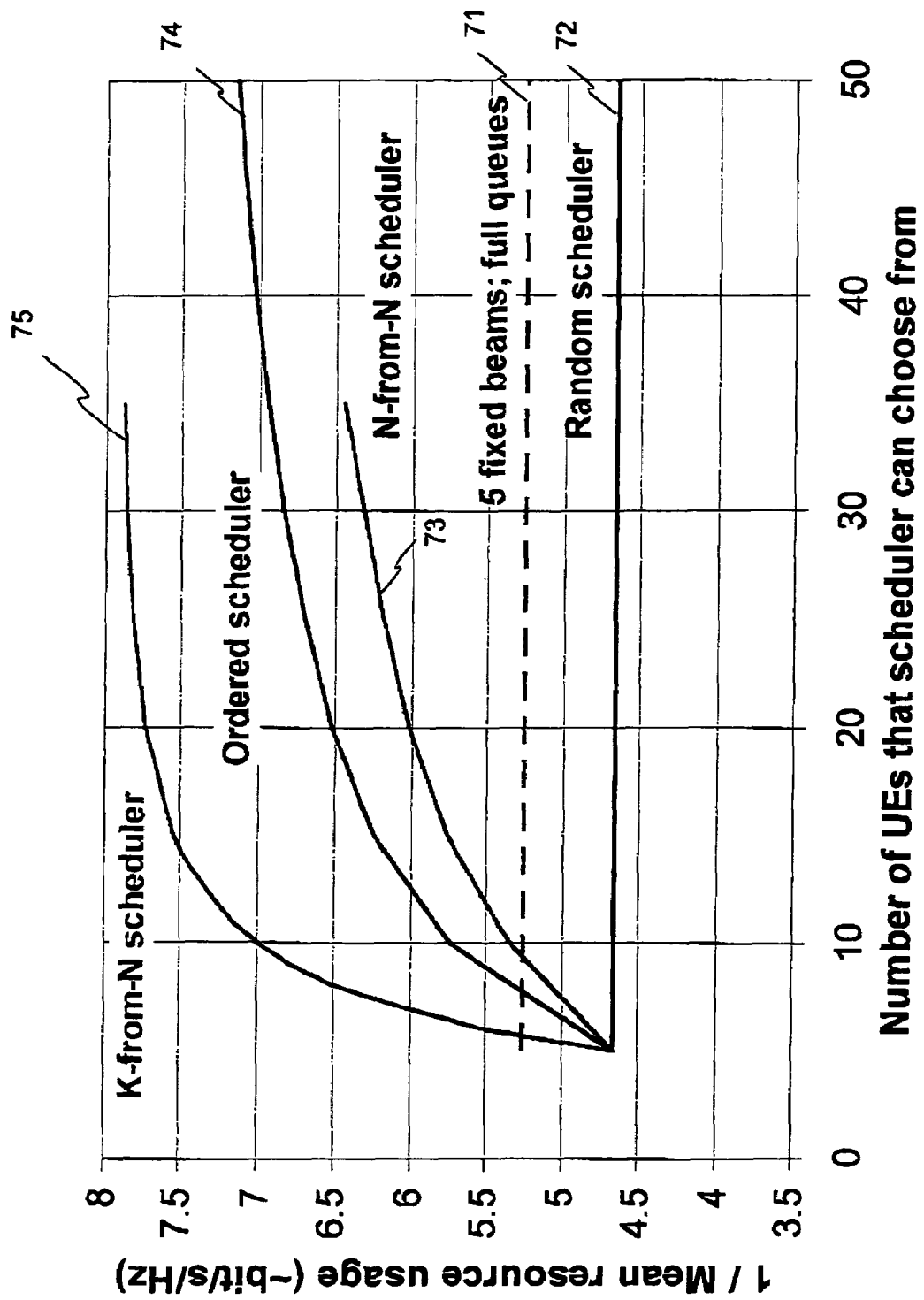
FIG. 7 is a plot of reciprocal mean resource usage versus a number of UEs that a scheduler can choose from, comparing results of the scheduling method of the invention with known scheduling methods for five beams.

FIG. 7 shows similar results for a 5-beam antenna, from which it can be seen that for five beams random scheduling, plot 72, provides worse capacity than using 5 fixed beams with full queues, plot 71. Again, the ordered scheduler according to the invention, plot 74, can be seen to provide improved capacity for all plotted values compared with an N-from-N scheduler, plot 73, i.e. choosing the best groups first and then the second best and so on. Again, the K-from-N scheduler plot 75, representing communication with only a selection of user equipments within the sector and ignoring of other user equipments, is not practically feasible where a service has to be provided to all user equipments in the sector, and does not meet the criteria of equal data throughput to all user equipments in the sector.

Figure 8:
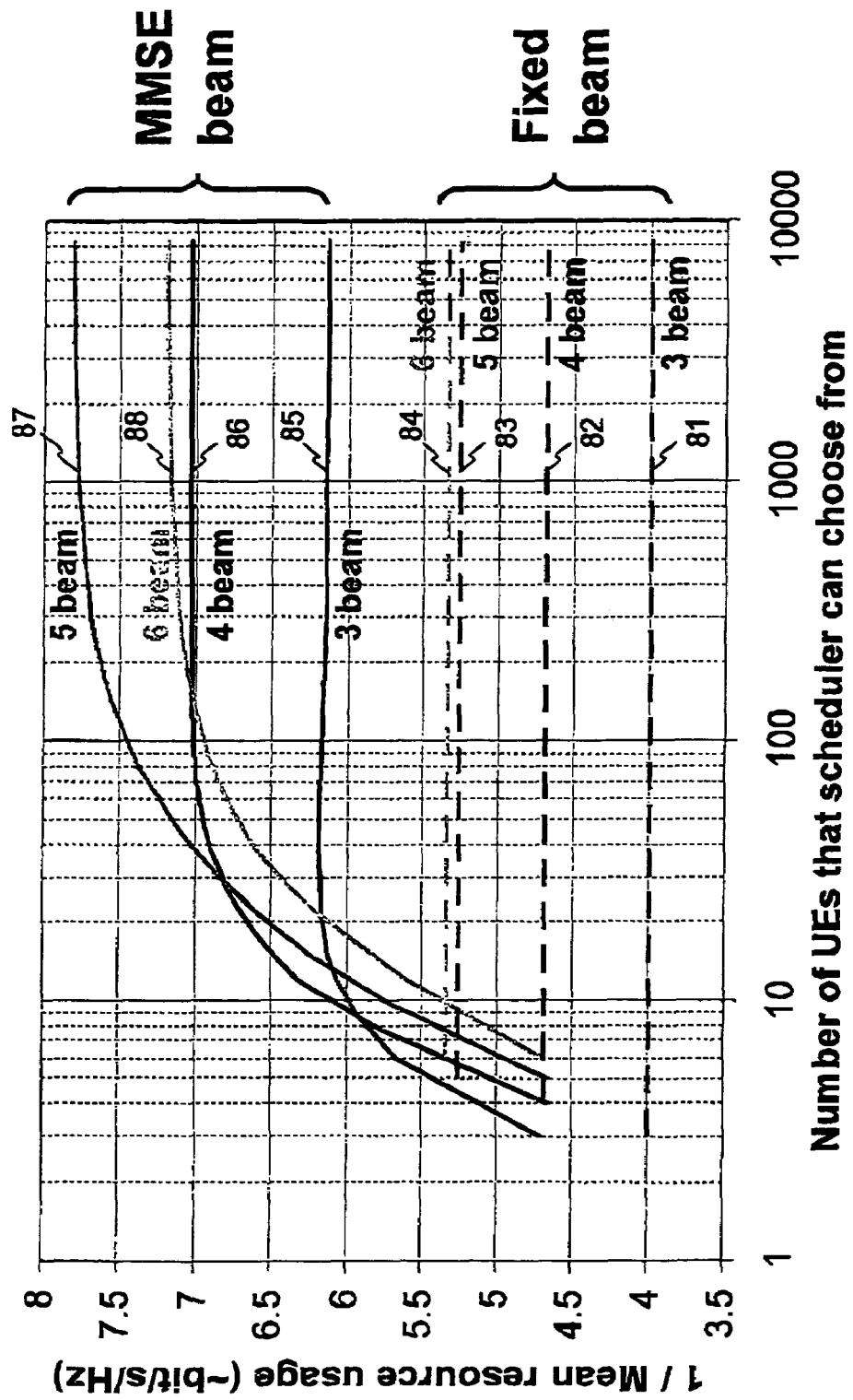
FIG. 8 is a plot of reciprocal mean resource usage versus a number of UEs that a scheduler can choose from, comparing results of the scheduling method of the invention using from three to six beams.

FIG. 8 compares the mean resource usage using three to six fixed beams, plots 81-84 respectively, and three to six Minimum Mean Squared Error (MMSE) beams, plots 85 to 88 respectively, from which it can be seen that with more than 30 user equipments, the best mean resource usage is obtained with five MMSE beams, plot 87.

The embodiment described above is suitable where there is little scattering between the UEs and the base station, so that a sufficiently precise Angle of Arrival may be obtained to place the UEs in order of their angles of arrival. In general, this will not be the case.

When angle spread is present, for example due to scattering, but there is a reasonably high correlation across the array elements, a first modified approach is used.

"Scatter maps" showing multipath in angle and delay seen from a base station show that an angle of arrival (AoA) distribution for a dense urban macrocell is relatively sharply peaked in angle, with most of the power within a few degrees, with weaker outliers. This means there is a relatively high correlation across the array elements, unlike a situation with random wavefronts. It is reasonable to associate each UE with a particular AoA. This may be a "centre of gravity" of a power distribution in angle, a peak of the distribution, or some other parameter. However, the centre of gravity approach is susceptible to being "pulled" by a weak, but far out, outlier, and the peak could be the greater of two near equal peaks, so neither of these is very satisfactory. Of more direct application to SDMA is the correlation of wavefronts between multiple users, so a correlation metric is preferable.

Referring to FIG. 22, in an embodiment of the invention, a sector served by an antenna is divided into ranges of angle of arrival of say 1° and signatures of plane waves receivable from each range determined, step 221. For each of a plurality N of UEs served by a particular array, complex correlations of the spatial signature seen at the array with the plane wave excitations are calculated, step 222. For each UE, the correlation with one of the plane waves will be greatest and that UE is assigned, step 223, to a "bin", or range of angles of arrival, associated with the AoA of the corresponding plane wave. This procedure is repeated until all UEs have been assigned to a respective bin. Thereby, the UEs are ordered across the sector according to their bins. If a particular bin is empty, the ordering is thereby unaffected. If a bin has multiple UEs, the UEs in the bin are assigned an arbitrary order, such as an order in which the UEs were put into the bin.

The only ordering ambiguities are for UEs whose spatial signatures are very close together, and these will not be scheduled together anyway.

Having ordered the UEs, the SDMA groups are found as in the case with no angle spread described above.

The approach given above is bound to give a solution, and given the physics of a macrocell situation, the solution should be close to optimum.

The situation is more complicated where there is sufficient scattering that there is little correlation across the array elements, and a second modification is required.

In this embodiment UEs are clustered into orthogonal sets generated by Grassmannian packing solutions and a density of packing gives some indication of the spread of the sets and the maximum cross correlation between them. In other words, the UEs random spatial signatures are vector-quantized to the nearest Grassmannian beams that have been pre-sorted into orthogonal groups, and assigned to the Grassmannian beam with which the spatial signature correlates, in a manner to be described hereinbelow.

Referring to FIG. 23, the steps involved in SDMA scheduling with random wavefronts are as follows.

Determine, step 231, a number N of SDMA beams for the array.

Define, step 232, M sets of N orthogonal beams and their M×N associated Grassmannian vectors.

For each UE, find, step 233, the Grassmannian vector with which the UE's spatial signature has maximum correlation.

For each Grassmannian vector, produce, step 234, a sub-list of associated UEs

For each set of N orthogonal Grassmannian vectors, produce, step 235, a list of UEs divided into sub-lists In any one timeslot, transmit, step 236, simultaneously to no more than one UE from each sub-list within the list for one of the M sets.

M sets of orthogonal beams are needed so that the groups of UEs associated with each Grassmannian vector are disjoint across each orthogonal set, so that UEs with highly correlated spatial signatures cannot be scheduled simultaneously.

The above method for random wavefronts does not necessarily give equal throughput to each user, either due to varying C/I and hence AMC rate, or due to unequal numbers of UEs in each sub list, or both.

The variable AMC rate can be dealt with as described earlier, by giving UEs with lower C/I ratios multiple entries in the sub-lists.

Once this has been done, the number of entries in each sub-list may be unequal. In some cases the number of entries can be equalised by varying the boundaries between adjacent Grassman vectors. If this is not possible, a two stage approach is available as follows:

Within one of the M sets, the number of entries served in each time slot can be arranged to be nearly equal (for example 4 sub-lists of length 2, 3, 4, 4 can be served in groups of size 4, 3, 3, 3). Between the M sets, variations of number of timeslots per set can be used as for standard equal throughput scheduling.

The random channel Multiple Input Multiple Output (MIMO) problem has a close connection with Grassmannian packing theory which is known as a vector quantizer to minimize the size of a binary description of a beamformer for downlink transmit diversity. As discussed in J. H. Conway, R. H. Hardin and N. J. A. Sloane: *"Packing Lines, Planes, etc.: Packings in Grassmannian Spaces"*, Experimental Mathematics, Vol. 5 (1996), 139-159, Grassmannian packing generates a set of m lines passing through the origin which have a maximised closest separation and each line may be equated to a generalized beam in n space for an n element transmit antenna. Grassmannian packing maximises the minimum angular separation of the m lines and the resulting set of vectors is maximally uniformly spaced and optimal for use as vector quantizers.

In this embodiment, each line direction is identified with a generalized beamformer and the closeness of the lines can be related to mutual interference between the beams. This has applications in beamforming design and optimization of space time block codes and unitary modulation and is the generalization of the direction resolution concepts associated with plane waves described hereinbefore applied to random channel conditions where there are no plane waves. Under plane wave conditions in a uniformly spaced array, the array manifold is $$S(\theta)=\{1, e^{j\theta}, e^{2j\theta}, \ldots, e^{(n-1)j\theta}\} \qquad (1.1)$$

where $\theta$ is a measure of a direction of a source. The array manifold forms a basis for the vector space, since by sampling $S(\theta)$ n times with appropriate spacings the vectors can be organized into a discrete Fourier transform (DFT) matrix, which is known to be unitary and is a basis for the n-vector space.

However, a plane wave model excludes much of the vector space, for example elements with zero amplitude are not present in (1.1) and can only be generated by adding together two plane wave signatures which cancel at one element. So there is some reason for supposing that the array manifold (1.1) does not scan over the surface of the hyperplane in a uniformly distributed manner as θ is varied and is not necessarily a suitable option for scanning random channels.

Under random scattering channel conditions an equivalent array manifold is just $$S(\theta) = \{x_0(\theta), x_1(\theta), \ldots, x_{N-1}(\theta)\} \quad (1.2)$$

where $x_i(\theta)$ is some random function of the UEs location θ and may be rapidly varying if there is local scattering around the UEs. It is necessary to determine how many UEs can be resolved in SDMA mode given such a specification and how orthogonal sets or groups can be efficiently selected from a population of UEs.

Grassmannian packing theory provides a pre-computed sampled vector space in the form of m lines which pass through the origin and which have a minimum spacing between them according to some distance metric. These lines can be assumed to be as uniformly separated in the space as possible and, for random channels, can be taken as the set of optimal beam directions which sample the field with m generalized beams.

A spacing δ between vectors $X_1$ and $X_2$ is usually defined in terms of a normalised dot product between the vectors $X_1$ and $X_2$:

$$\cos(\delta) = \frac{X_1^T X_2}{\sqrt{X_1^T X_1 X_2^T X_2}} \quad (1.3)$$

Figure 9:
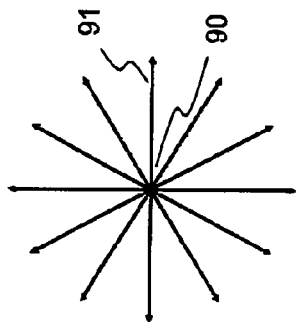
FIG. 9 shows Grassmannian lines in two dimensions, helpful in understanding an embodiment of the invention.

As shown in FIG. 9, for two dimensions the m lines 91 are equally spaced around 360°, i.e. equally spaced lines pass through the origin 90 in two dimensions.

Figure 10:
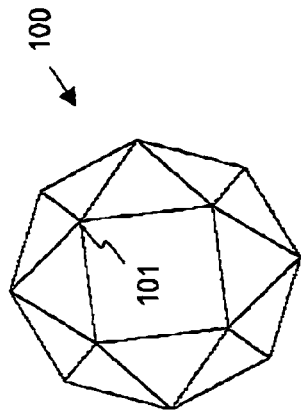
FIG. 10 shows a solid defining Grassmannian lines in three dimensions, helpful in understanding an embodiment of the invention.

In three dimensions the solution is much less obvious, although in certain cases the lines coincide with the vertices of regular polyhedrons, such as the tetrahedron and dodecahedron. FIG. 10 shows a three-dimensional FIG. 100 whose vertices 101 define line directions through the centre of the figure for a best packing of 16 lines in 3-space, as known from J. H. Conway, R. H. Hardin and N. J. A. Sloane: "*Packing Lines, Planes, etc., Packings in Grassmannian Spaces*", Experimental Mathematics, Vol. 5 (1996), 139-159. Interestingly the shape is asymmetric.

The 16 vertices 101 in the three-dimensional FIG. 100 shown in FIG. 10 are antipodal, so under some definitions there are only eight different directions. In particular, in array theory, the phases of the sources are not usually significant. The antenna vector space is the complex space $C^n$ and the distance δ between vectors is then defined by:

$$\cos(\delta) = \frac{X_1^H X_2}{\sqrt{X_1^H X_1 X_2^H X_2}} \quad (2.1)$$

where $(.)^H$ is a Hermitian transpose. Only real valued vectors are used herein.

In an ideal channel, an orthogonal set of conventional sinx/x beams allows ideal SDMA on the downlink. The locations of the UEs can also be arbitrary and adding zero forcing to the conventional beams generates an orthogonal set with zeros in the right places, i.e. pointing to the other UEs. However, it is highly preferable to begin with a UE vector set which is already nearly orthogonal, if zero forcing without ill-conditioning is to be expected.

Figure 11:
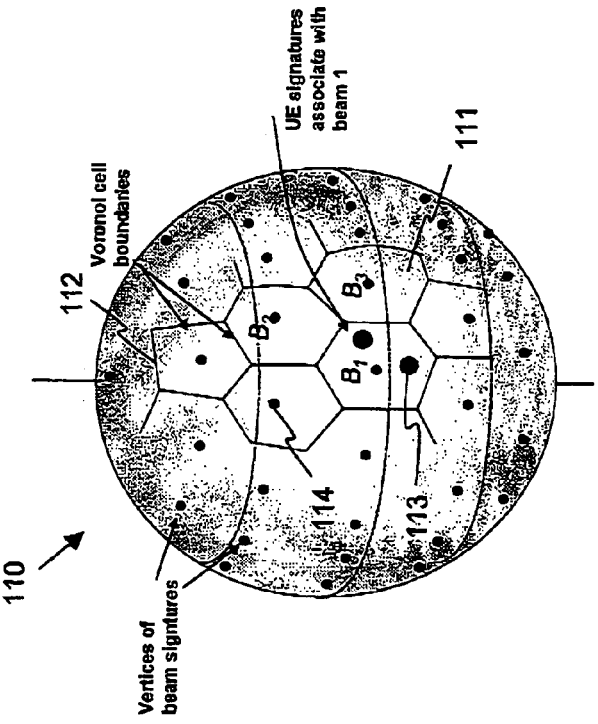
FIG. 11 illustrates use of Grassmannian tiles on a surface of a solid, as used in an embodiment of the invention.

In a scattering channel, SDMA can be achieved either by selecting orthogonal beam-forming vectors or by zero forcing but there is no guidance in the prior art how to select a set of such beams and how to relate UEs with random signatures to an orthogonal set of beams in arbitrary n-space. In this embodiment of the invention, the solution is to form a set of m tiles, with similar areas, on the surface of the n sphere 110, illustrated in FIG. 11. The Grassmannian packing vectors are an efficient way to define centres $B_1$, $B_2$, $B_3$ of these tiles and edges 112 of the tiles 111 are found in principle by generating Voronoi lines that are equidistant from two such centres $B_1$, $B_2$, $B_3$, as shown in FIG. 11. UE signatures 113 are classified by the tiles 111 into which they fall and for which the δ defined by (2.1), between the signature and the beam, is smallest. FIG. 11 shows a set of packing lines 114 on a 3-sphere, represented by dots $B_1$, $B_2$, $B_3$. The Voronoi lines 112 divide the surface into tiles 111 and a UE is ordered according to a tile 111 into which a signature 113 of the UE falls.

If the tile centres $B_1$, $B_2$, $B_3$ are separated into m orthogonal sets then m near-orthogonal tiles are used in a timeslot to perform downlink SDMA. Either the Grassmannian vectors or the actual UE signatures are used as beamformers. In either case, approximately m/n sets of orthogonal tiles are required to exhaust the whole space and using these in a sequence all UEs can be addressed in SDMA mode.

Figure 12:
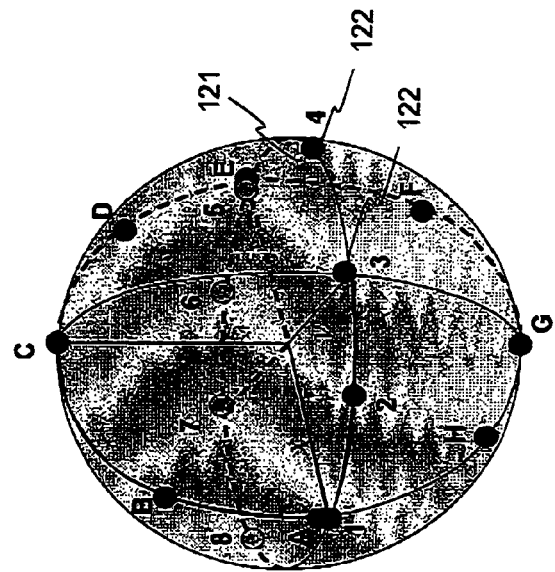
FIG. 12 illustrates sets of spatial signatures of the solid of FIG. 11.

The task of selecting tiles that are almost orthogonal is illustrated for a special case of $2^N$-dimensional space, where N is any integer, which is straightforward, yet is applicable to a 4-element TX antenna, i.e. N=2 for 4 elements. Referring to FIG. 12, an arbitrary 2D subspace 121 from the $2^N$-dimensions is chosen and 8 directions 122 are set up in the subspace, separated by 45°.

That is, denoting this subspace 121 as the xy plane, the points 122 labelled 1 to 8 are laid out at 45° intervals as shown in FIG. 12. The maximum coupling, i.e. the cosine of the angle between them, of any pair of these points 122 is $1/\sqrt{2}$ and these could form a 2-D spatial signature set. These points can be generated by taking the xy polar points $$\{x, y\} = \begin{pmatrix} 1 & 0 \\ 0 & 1 \end{pmatrix} \quad (3.1)$$

and augmenting these by all the possible normalised sums, i.e.

$(x+y)/\sqrt{2}$, $(x-y)\sqrt{2}$ we get:

$$\{U_1, U_2\} = \begin{pmatrix} 1 & \frac{1}{\sqrt{2}} & \frac{1}{\sqrt{2}} & 0 \\ 0 & \frac{1}{\sqrt{2}} & \frac{-1}{\sqrt{2}} & 1 \end{pmatrix} \quad (3.2)$$

These four vectors, together with their four reversals, form the eight points 122 in the xy plane.

The plane xz is orthogonal to y. If the diagram were in 4-D there would be a similar plane orthogonal to the plane xy, the zu plane say, and 4 points and their reversals could be laid out in this plane also, leading to a total system of 8 points and their reversals. Assembling all the points found thus far gives a system of 8 vertices:

$$\{V_1, V_2\} = \quad (3.3)$$

-continued $$\{\begin{matrix} U_1 & 0 \\ 0 & U_2 \end{matrix}\} \begin{pmatrix} 1 & \frac{1}{\sqrt{2}} & \frac{1}{\sqrt{2}} & 0 & 0 & 0 & 0 & 0 \\ 0 & \frac{1}{\sqrt{2}} & \frac{-1}{\sqrt{2}} & 1 & 0 & 0 & 0 & 0 \\ 0 & 0 & 0 & 0 & 1 & \frac{1}{\sqrt{2}} & \frac{1}{\sqrt{2}} & 0 \\ 0 & 0 & 0 & 0 & 0 & \frac{1}{\sqrt{2}} & \frac{-1}{\sqrt{2}} & 1 \end{pmatrix}$$

plus all reversals, making 16 bipodal vertices.

Taking all sums and differences of points from the xy and zu planes gives rise to the 16 vertices:

$$[w_1 \ldots w_{16}] = \left\{V_1, \frac{V_1 + V_2}{\sqrt{2}}, \frac{V_1 - V_2}{\sqrt{2}}, V_2\right\} = \qquad (3.4)$$

$$\begin{pmatrix} 1 & \frac{1}{\sqrt{2}} & \frac{1}{\sqrt{2}} & 0 & \frac{1}{\sqrt{2}} & \frac{1}{2} & \frac{1}{2} & 0 & \frac{1}{\sqrt{2}} & \frac{1}{2} & \frac{1}{2} & 0 & 0 & 0 & 0 & 0 \\ 0 & \frac{1}{\sqrt{2}} & \frac{-1}{\sqrt{2}} & 1 & 0 & \frac{1}{2} & \frac{-1}{2} & \frac{1}{\sqrt{2}} & 0 & \frac{1}{2} & \frac{-1}{2} & \frac{1}{\sqrt{2}} & 0 & 0 & 0 & 0 \\ 0 & 0 & 0 & 0 & \frac{1}{\sqrt{2}} & \frac{1}{2} & \frac{1}{2} & 0 & \frac{-1}{\sqrt{2}} & \frac{-1}{2} & \frac{-1}{2} & 0 & 1 & \frac{1}{\sqrt{2}} & \frac{1}{\sqrt{2}} & 0 \\ 0 & 0 & 0 & 0 & 0 & \frac{1}{2} & \frac{-1}{2} & \frac{1}{\sqrt{2}} & 0 & \frac{1}{2} & \frac{-1}{2} & \frac{1}{\sqrt{2}} & 0 & \frac{1}{\sqrt{2}} & \frac{-1}{\sqrt{2}} & 1 \end{pmatrix}$$

and a further 16 antipodal versions, making 32 vertices altogether. This defines the 16 directions required in the 4D space. Whether or not this has the optimality properties of a proper Grassmannian set, it is found to be sufficiently close to be useful for the present invention. The dot products $W^T.W$ of the 16 columns of W thus generated are shown in the following table:

A whole population of UEs are segregated into 16 sets according to their biggest dot products with the 16 columns of W, i.e. they are sorted according to which Voronoi tile their signature falls in. It is necessary to select 4 UEs out of the groups such that whatever their exact locations they are reasonably orthogonal and can be addressed in parallel using SDMA without too much mutual interference.

Taking four vectors at a time is consistent with the phased array embodiment described above and fits in with an intuitive idea that four UEs can be addressed simultaneously with four orthogonal beams, whether these be orthogonal sinx/x plane wave patterns or generalized beams for scattering environments. Taking four UEs at a time gives rise to four timeslots each addressing four UEs.

To select such a set of vectors the four UE signatures closest to the natural coordinate vectors are taken, to form a matrix $S_1$ below using columns $W_1$, $W_4$, $W_{13}$, and $W_{16}$.

For the second set, the next unused vector $W_2$ is taken, and the matrix $S_2$ completed by finding a 4×4 identity submatrix in $W^T.W$, with first vector $W_2$. This is unique and only mathematically consistent with rows and columns {2, 7, 11, and 14}, which are shaded in the table above to illustrate the procedure.

TABLE 1

| 1.00 | 0.71 | 0.71 | 0.00 | 0.71 | 0.50 | 0.50 | 0.00 | 0.71 | 0.50 | 0.50 | 0.00 | 0.00 | 0.00 | 0.00 | 0.00 |
|---|---|---|---|---|---|---|---|---|---|---|---|---|---|---|---|
| 0.71 | 1.00 | 0.00 | 0.71 | 0.50 | 0.71 | 0.00 | 0.50 | 0.50 | 0.71 | 0.00 | 0.50 | 0.00 | 0.00 | 0.00 | 0.00 |
| 0.71 | 0.00 | 1.00 | −0.71 | 0.50 | 0.00 | 0.71 | −0.50 | 0.50 | 0.00 | 0.71 | −0.50 | 0.00 | 0.00 | 0.00 | 0.00 |
| 0.00 | 0.71 | −0.71 | 1.00 | 0.00 | 0.50 | −0.50 | 0.71 | 0.00 | 0.50 | −0.50 | 0.71 | 0.00 | 0.00 | 0.00 | 0.00 |
| 0.71 | 0.50 | 0.50 | 0.00 | 1.00 | 0.71 | 0.71 | 0.00 | 0.00 | 0.00 | 0.00 | 0.00 | 0.71 | 0.50 | 0.50 | 0.00 |
| 0.50 | 0.71 | 0.00 | 0.50 | 0.71 | 1.00 | 0.00 | 0.71 | 0.00 | 0.00 | 0.00 | 0.00 | 0.50 | 0.71 | 0.00 | 0.50 |
| 0.50 | 0.00 | 0.71 | −0.50 | 0.71 | 0.00 | 1.00 | −0.71 | 0.00 | 0.00 | 0.00 | 0.00 | 0.50 | 0.00 | 0.71 | −0.50 |
| 0.00 | 0.50 | −0.50 | 0.71 | 0.00 | 0.71 | −0.71 | 1.00 | 0.00 | 0.00 | 0.00 | 0.00 | 0.00 | 0.50 | −0.50 | 0.71 |
| 0.71 | 0.50 | 0.50 | 0.00 | 0.00 | 0.00 | 0.00 | 0.00 | 1.00 | 0.71 | 0.71 | 0.00 | −0.71 | −0.50 | −0.50 | 0.00 |
| 0.50 | 0.71 | 0.00 | 0.50 | 0.00 | 0.00 | 0.00 | 0.00 | 0.71 | 1.00 | 0.00 | 0.71 | −0.50 | −0.71 | 0.00 | −0.50 |
| 0.50 | 0.00 | 0.71 | −0.50 | 0.00 | 0.00 | 0.00 | 0.00 | 0.71 | 0.00 | 1.00 | −0.71 | −0.50 | 0.00 | −0.71 | 0.50 |
| 0.00 | 0.50 | −0.50 | 0.71 | 0.00 | 0.00 | 0.00 | 0.00 | 0.00 | 0.71 | −0.71 | 1.00 | 0.00 | −0.50 | 0.50 | −0.71 |
| 0.00 | 0.00 | 0.00 | 0.00 | 0.71 | 0.50 | 0.50 | 0.00 | −0.71 | −0.50 | −0.50 | 0.00 | 1.00 | 0.71 | 0.71 | 0.00 |
| 0.00 | 0.00 | 0.00 | 0.00 | 0.50 | 0.71 | 0.00 | 0.50 | −0.50 | −0.71 | 0.00 | −0.50 | 0.71 | 1.00 | 0.00 | 0.71 |
| 0.00 | 0.00 | 0.00 | 0.00 | 0.50 | 0.00 | 0.71 | −0.50 | −0.50 | 0.00 | −0.71 | 0.50 | 0.71 | 0.00 | 1.00 | −0.71 |
| 0.00 | 0.00 | 0.00 | 0.00 | 0.00 | 0.50 | −0.50 | 0.71 | 0.00 | −0.50 | 0.50 | −0.71 | 0.00 | 0.71 | −0.71 | 1.00 |

From consideration of the largest figures in Table 1 it is evident that the minimum distance corresponds to a dot product of 0.707, equivalent to an angle of 45° in R 2.

This provides a regular rectangular tiling with 32 points on the 4D sphere each vector $W_i$ defining the centre of a tile. Each point has four nearest neighbours at 45° separation, four neighbours at 60° and the rest of the points are orthogonal at 90°.

The next unused vector is $W_3$ and with elements from columns {3, 6, 10, and 15} of W another identity submatrix is generated in $W^T W$.

Finally the next unused vector is $W_5$ and this forms an identity matrix using columns {5, 8, 9, 12}.

$$S_1 = \begin{pmatrix} 1 & 0 & 0 & 0 \\ 0 & 1 & 0 & 0 \\ 0 & 0 & 1 & 0 \\ 0 & 0 & 0 & 1 \end{pmatrix} S_2 = \begin{pmatrix} \frac{1}{\sqrt{2}} & \frac{1}{2} & \frac{1}{2} & 0 \\ \frac{1}{\sqrt{2}} & \frac{-1}{2} & \frac{-1}{2} & 0 \\ 0 & \frac{1}{2} & \frac{-1}{2} & \frac{1}{\sqrt{2}} \\ 0 & \frac{-1}{2} & \frac{1}{2} & \frac{1}{\sqrt{2}} \end{pmatrix} S_3 = \quad (3.5)$$

$$\begin{pmatrix} \frac{1}{\sqrt{2}} & \frac{1}{2} & \frac{1}{2} & 0 \\ \frac{-1}{\sqrt{2}} & \frac{1}{2} & \frac{1}{2} & 0 \\ 0 & \frac{1}{2} & \frac{-1}{2} & \frac{1}{\sqrt{2}} \\ 0 & \frac{1}{2} & \frac{-1}{2} & \frac{-1}{\sqrt{2}} \end{pmatrix} S_4 =$$

$$\begin{pmatrix} \frac{1}{\sqrt{2}} & 0 & \frac{1}{\sqrt{2}} & 0 \\ 0 & \frac{1}{\sqrt{2}} & 0 & \frac{1}{\sqrt{2}} \\ \frac{1}{\sqrt{2}} & 0 & \frac{-1}{\sqrt{2}} & 0 \\ 0 & \frac{1}{\sqrt{2}} & 0 & \frac{-1}{\sqrt{2}} \end{pmatrix}$$

This procedure has generated 4 sets of orthogonal vectors. The sets are not mutually orthogonal but so long as four vectors are selected from only one set four orthogonal vectors are provided. Moreover the 16 vectors span the vector space in a uniform manner. Thus the required conditions have been set up to drive an SDMA downlink system in a random channel. The simplicity of this selection probably is related to selecting an antenna with $2^2$ elements and there is no guarantee that a similarly simple operation could be carried out for odd-numbered element antennas where the Grassmannian packing is less regular. Table 2 shows the cross coupling matrix when the columns of W are permuted into the order used in Equation (3.5). The coupling is now diagonal on the leading submatrix blocks.

Next a maximum non-orthogonality of two of the beams is estimated for the case of random vectors allocated to each. Due to a high degree of symmetry only one of the $S_k$ sets needs to be examined, and the first one using the identity matrix as beam-formers is the simplest. This has selected vectors $W_1$, $W_4$, $W_{13}$ and $W_{16}$.

From Table 1, the vectors $W_2$, $W_3$, $W_5$ and $W_9$ are nearest neighbours to $W_1$, having a dot product of $1/\sqrt{2}$. Effectively these neighbours shift the first unit vector by 45° toward one of the other three unit vectors.

$W_2$ is a common nearest neighbour of $W_1$ and $W_4$ so non-orthogonality is generated by presenting vectors in $W_1$ and $W_4$ directions which are both contaminated by addition of a small level of $W_2$. The contamination cannot be too great or the vectors would shift into $W_2$'s Voronoi cell.

The maximum amount that $W_1$ can be nudged in the $W_2$ direction without actually moving into $W_2$ cell is a 22.5° vector half way between them:

$$W_1 + \Delta_1 = \frac{W_1 + W_2}{|W_1 + W_2|} = \frac{\begin{pmatrix} 1 + \frac{1}{\sqrt{2}} \\ \frac{1}{\sqrt{2}} \\ 1 + \frac{1}{\sqrt{2}} \\ \frac{1}{\sqrt{2}} \end{pmatrix}}{\left| 1 + \frac{1}{\sqrt{2}} \right|} = \frac{\begin{pmatrix} 1 + \frac{1}{\sqrt{2}} \\ \frac{1}{\sqrt{2}} \end{pmatrix}}{\sqrt{2 \left(1 + \frac{1}{\sqrt{2}}\right)}}$$

and the vector halfway between $W_4$ and $W_2$ is:

$$W_4 + \Delta_4 = \frac{W_4 + W_2}{|W_4 + W_2|} = \frac{\begin{pmatrix} \frac{1}{\sqrt{2}} \\ 1 + \frac{1}{\sqrt{2}} \\ \frac{1}{\sqrt{2}} \\ 1 + \frac{1}{\sqrt{2}} \end{pmatrix}}{\left|\frac{1}{\sqrt{2}}\right|} = \frac{\begin{pmatrix} \frac{1}{\sqrt{2}} \\ 1 + \frac{1}{\sqrt{2}} \end{pmatrix}}{\sqrt{2 \left(1 + \frac{1}{\sqrt{2}}\right)}}$$

The dot product between these two vectors represents the maximum correlation of the sources. We have:

TABLE 2

Cross product matrix of column permutation of 16 beam-formers, $W_P^T W_P$.

| 1.00 | 0.00 | 0.00 | 0.00 | 0.71 | 0.50 | 0.50 | 0.00 | 0.71 | 0.50 | 0.50 | 0.00 | 0.00 | 0.00 | 0.71 | 0.00 |
|---|---|---|---|---|---|---|---|---|---|---|---|---|---|---|---|
| 0.00 | 1.00 | 0.00 | 0.00 | 0.71 | −0.50 | −0.50 | 0.00 | −0.71 | 0.50 | 0.50 | 0.00 | 0.00 | 0.71 | 0.00 | 0.71 |
| 0.00 | 0.00 | 1.00 | 0.00 | 0.00 | 0.50 | −0.50 | 0.71 | 0.00 | 0.50 | −0.50 | 0.71 | 0.71 | 0.00 | −0.71 | 0.00 |
| 0.00 | 0.00 | 0.00 | 1.00 | 0.00 | −0.50 | 0.50 | 0.71 | 0.00 | 0.50 | −0.50 | −0.71 | 0.00 | 0.71 | 0.00 | −0.71 |
| 0.71 | 0.71 | 0.00 | 0.00 | 1.00 | 0.00 | 0.00 | 0.00 | 0.00 | 0.71 | 0.71 | 0.00 | 0.50 | 0.50 | 0.50 | 0.50 |
| 0.50 | −0.50 | 0.50 | −0.50 | 0.00 | 1.00 | 0.00 | 0.00 | 0.71 | 0.00 | 0.00 | 0.71 | 0.71 | −0.71 | 0.00 | 0.00 |
| 0.50 | −0.50 | −0.50 | 0.50 | 0.00 | 0.00 | 1.00 | 0.00 | 0.71 | 0.00 | 0.00 | −0.71 | 0.00 | 0.00 | 0.71 | −0.71 |
| 0.00 | 0.00 | 0.71 | 0.71 | 0.00 | 0.00 | 0.00 | 1.00 | 0.00 | 0.71 | −0.71 | 0.00 | 0.50 | 0.50 | −0.50 | −0.50 |
| 0.71 | −0.71 | 0.00 | 0.00 | 0.00 | 0.71 | 0.71 | 0.00 | 1.00 | 0.00 | 0.00 | 0.00 | 0.50 | −0.50 | 0.50 | −0.50 |
| 0.50 | 0.50 | 0.50 | 0.50 | 0.71 | 0.00 | 0.00 | 0.71 | 0.00 | 1.00 | 0.00 | 0.00 | 0.71 | 0.71 | 0.00 | 0.00 |
| 0.50 | 0.50 | −0.50 | −0.50 | 0.71 | 0.00 | 0.00 | −0.71 | 0.00 | 0.00 | 1.00 | 0.00 | 0.00 | 0.00 | 0.71 | 0.71 |
| 0.00 | 0.00 | 0.71 | −0.71 | 0.00 | 0.71 | −0.71 | 0.00 | 0.00 | 0.00 | 0.00 | 1.00 | 0.50 | −0.50 | −0.50 | 0.50 |
| 0.71 | 0.00 | 0.71 | 0.00 | 0.50 | 0.71 | 0.00 | 0.50 | 0.50 | 0.71 | 0.00 | 0.50 | 1.00 | 0.00 | 0.00 | 0.00 |
| 0.00 | 0.71 | 0.00 | 0.71 | 0.50 | −0.71 | 0.00 | 0.50 | −0.50 | 0.71 | 0.00 | −0.50 | 0.00 | 1.00 | 0.00 | 0.00 |
| 0.71 | 0.00 | −0.71 | 0.00 | 0.50 | 0.00 | 0.71 | −0.50 | 0.50 | 0.00 | 0.71 | −0.50 | 0.00 | 0.00 | 1.00 | 0.00 |
| 0.00 | 0.71 | 0.00 | −0.71 | 0.50 | 0.00 | −0.71 | −0.50 | −0.50 | 0.00 | 0.71 | 0.50 | 0.00 | 0.00 | 0.00 | 1.00 |

$$(W_1 + \Delta_1)^T(W_4 + \Delta_4) = \frac{\sqrt{2}\left(1 + \frac{1}{\sqrt{2}}\right)}{2\left(1 + \frac{1}{\sqrt{2}}\right)} = \frac{1}{\sqrt{2}}$$

so the maximum correlation is the same as for the plane wave beamformer with a minimum UE spacing of ½ beamwidth so a similar performance may be expected.

Generation of complex valued Grassmannian beams is most easily done by using the above real vectors as a starting point. Taking an arbitrary complex unitary matrix Q the 16 vectors C=QW are formed. The cross correlation properties of C are identical to those of W, and C can be used in place of W for beam-forming in random channels and the problem is converted to a complex valued one.

By way of example, the 4×4 DFT matrix is used for Q. The un-normalized DFT matrix is:

$$Q = \begin{pmatrix} 1 & 1 & 1 & 1 \\ 1 & j & -1 & -j \\ 1 & -1 & 1 & -1 \\ 1 & -j & -1 & j \end{pmatrix} \text{ and } QW \text{ is}$$

$$\begin{pmatrix} 1 & \sqrt{2} & 0 & 1 & \sqrt{2} & 2 & 0 & \sqrt{2} & 0 & 0 & 0 & 0 & 1 & \sqrt{2} & 0 & 1 \\ 1 & \frac{1}{\sqrt{2}}(1+j) & \frac{1}{\sqrt{2}}(1-j) & j & 0 & 0 & 0 & 0 & \sqrt{2} & 1+j & 1-j & \sqrt{2}j & -1 & \frac{1}{\sqrt{2}}(-1-j) & \frac{1}{\sqrt{2}}(-1+j) & -j \\ 1 & 0 & \sqrt{2} & -1 & \sqrt{2} & \sqrt{2} & 2 & -\sqrt{2} & 0 & 0 & 0 & 0 & 1 & 0 & \sqrt{2} & -1 \\ 1 & \frac{1}{\sqrt{2}}(1-j) & \frac{1}{\sqrt{2}}(1+j) & -j & 0 & 0 & 0 & 0 & \sqrt{2} & 1-j & 1+j & -\sqrt{2}j & -1 & \frac{1}{\sqrt{2}}(-1+j) & \frac{1}{\sqrt{2}}(-1-j) & j \end{pmatrix}$$

The four sets of orthogonal beams $S_i$ become $S'_i = QS_i$ and are:

$$S'_1 = \begin{pmatrix} 1 & 1 & 1 & 1 \\ 1 & j & -1 & -j \\ 1 & -1 & 1 & -1 \\ 1 & -j & -1 & j \end{pmatrix} \quad S'_2 =$$

$$\begin{pmatrix} \sqrt{2} & 0 & 0 & \sqrt{2} \\ \frac{1}{\sqrt{2}}(1+j) & 0 & 1-j & \frac{1}{\sqrt{2}}(-1-j) \\ 0 & 2 & 0 & 0 \\ \frac{1}{\sqrt{2}}(1-j) & 0 & 1+j & \frac{1}{\sqrt{2}}(-1+j) \end{pmatrix} S'_3 =$$

$$\begin{pmatrix} 0 & 2 & 0 & 0 \\ \frac{1}{\sqrt{2}}(1-j) & 0 & 1+j & \frac{1}{\sqrt{2}}(-1+j) \\ 0 & 0 & 0 & \sqrt{2} \\ \frac{1}{\sqrt{2}}(1+j) & 0 & 1-j & \frac{1}{\sqrt{2}}(-1-j) \end{pmatrix} S'_4 =$$

-continued $$\begin{pmatrix} \sqrt{2} & \sqrt{2} & 0 & 0 \\ 0 & 0 & \sqrt{2} & \sqrt{2}j \\ \sqrt{2} & -\sqrt{2} & 0 & 0 \\ 0 & 0 & \sqrt{2} & -\sqrt{2}j \end{pmatrix}$$

(4.1)

The first set is just the conventional DFT matrix, an orthogonal set of plane waves, and we may have expected to get interpolating beams for one of the other sets, but this is not the case and it is not yet clear what the rest of the beams represent.

As a baseline result, downlink beam-forming for SDMA is considered for a case in which some sources may occur close together, if allowed, and there will be poor spatial differentiation, leading to degraded performance due to mutual interference. FIG. 13 shows the problem in the normal beamforming domain using conventional beams 131, 132 when the cross correlation is 2/π and FIG. 14 shows the zero forcing case with beams 141, 142.

Figure 17:
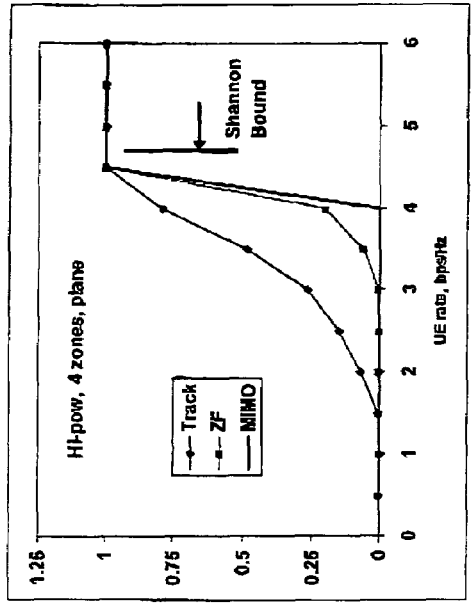
FIG. 17 shows comparative rate cumulative distribution functions for space division multiple access (SDMA), time division multiple access (TDMA) and zero forcing (ZF), for a high power transmitter.
Figure 16:
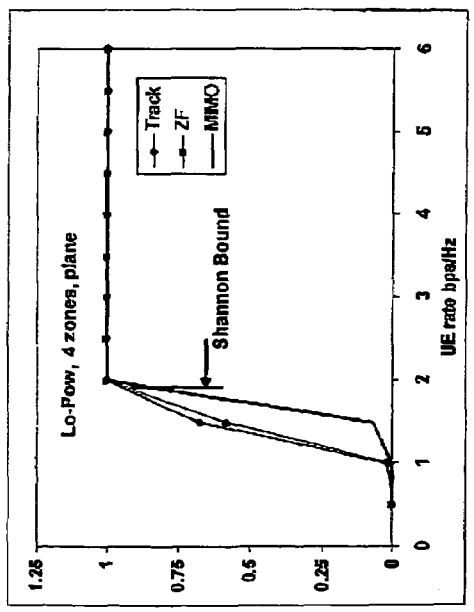
FIG. 16 shows comparative rate cumulative distribution functions for space division multiple access (SDMA), time division multiple access (TDMA) and zero forcing (ZF), for a low power transmitter.

By selecting UEs in turn from one of two sets of fragmented zones, as shown in FIG. 15, it can be guaranteed that no two UEs will be closer than ½ beamwidth and the cross coupling will always be less than 2/π. FIGS. 16 and 17 show bit rate performance obtained using tracking conventional beams, zero forcing, and MIMO. Apart from a slight excess of low rate transfers, the system operates quite close to the Shannon limit.

Figure 18:
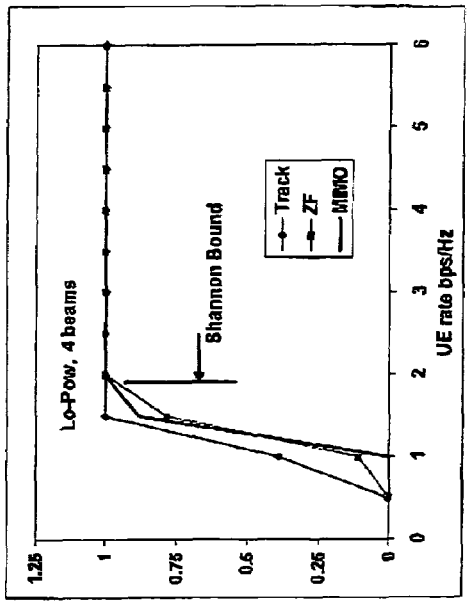
FIG. 18 is a plot of UE bit rate distributions for 10 dB transmitter power.

The embodiment of the invention has been tested on an $S_1$ beam-former set. UE signatures are generated randomly using four real Gaussian random numbers, which are known to be spherically symmetric in any number of dimensions, unlike uniform random numbers, which form cubical probability distribution functions. The generator is run until a vector has occupied each tile and each signature is then normalised to unit length. FIG. 18 shows the cumulative distribution function of UE bit rates for a 10 dB transmitter power using a conventional tracking beam, zero forcing and MIMO options.

The results are consistent with, although slightly inferior to, the 4-beam plane wave test above. Note that the Shannon bound is for four ideal equal power orthogonal links to four UEs without mutual interference. The best throughput in any particular random channel is the cooperative MIMO rate.

Figure 19:
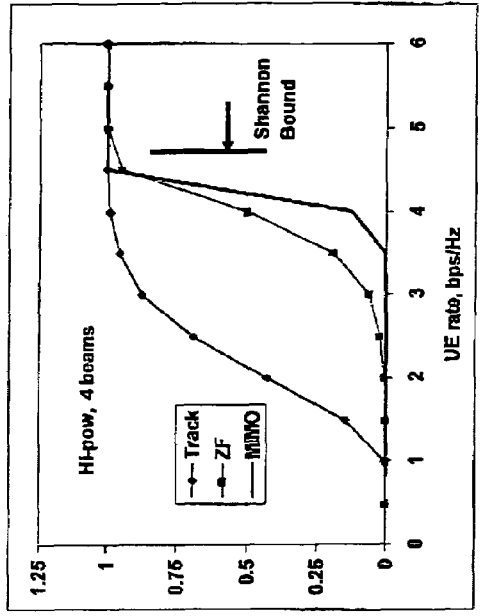
FIG. 19 is a plot of UE bit rate distributions for 20 dB transmitter power.

FIG. 19 shows the result of increasing the transmitter power to 20 dB. Again the results are similar to the plane wave results for a comparable situation.

The downlink SDMA throughput for a random channel matrix using beamformers derived from a form of Grassmannian line packing has been tested. For a 4-element antenna, 16 equally spaced beams in 4-space can be found with a maximum cross coupling of $1/\sqrt{2}$. This is more beams than the usual plane wave conventional beams would need, where there would be only eight beams at half beamwidth spacing with a maximum coupling of $\sin \frac{1}{2}\pi/\frac{1}{2}\pi$.

By selection of four sets of four orthogonal beams from these 16 Grassman vectors sets, four parallel downlink beams are formed and four UEs from the population are selected which have maximum response in these beams, one in each beam. The maximum coupling between two UEs signatures in the subset is also $1/\sqrt{2}$ which is sufficiently decoupled to allow an efficient zero forcing algorithm on the downlink which removes residual inter-user correlations without ill-conditioned solutions.

The throughput is comparable to tests on downlink plane wave beamforming in an ideal channel so is quite close to the Shannon bound for four ideal orthogonal downlinks. This indicates that there is no impediment to multiple access (SDMA) in random channels compared with ideal channels.

It is likely that optimally packed beams are advantageous to use in a random transmit beam system, proposed in P. Viswanath, D. Tse and R. Laroia: "*Opportunistic Beamforming using Dumb Antennas*", IEEE Transactions on Information Theory, 48, No. 6, June 2002, pp 1277-1294, which emulates fast Rayleigh fading. No particular beam sets are specified here, but there is a comparison made between random beamforming and space time block coding, the latter being similar to a very fast version of the former where each time symbol in the space time code generates a random beam. This comparison indicates that a space time block code optimised for random scattering channels is unlikely to be efficient when used in plane wave non-scattering channels. The random channel code would generate a significant proportion of instantaneous beams which failed to couple strongly to any receivers at all and this transmit power would be wasted. Thus space time block codes need to be optimised for a particular channel type.

There is also a connection between Grassmannian packing and unitary modulation constellations for achieving MIMO capacity, see T. Marzetta and B. Hochwald: "*Capacity of a Mobile Multiple-Antenna Communication Link in Rayleigh Flat Fading*", IEEE Transactions on Information Theory, 45, January 1999, pp. 139-157.

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example microwave or infrared. The series of computer instructions can constitute all or part of the functionality described above, and can also be stored in any memory device, volatile or non-volatile, such as semiconductor, magnetic, optical or other memory device.

Although the present invention has been described with reference to preferred embodiments, workers skilled in the art will recognize that changes may be made in form and detail without departing from the spirit and scope of the invention.

We claim:

1. A method of space division multiple access scheduling comprising the steps of:
    a) providing a transmitter having an antenna array with a plurality of beams;
    b) determining, and storing at the transmitter, angles of arrival of signals and identifiers from a plurality of user equipments;
    c) sorting the identifiers of the user equipments in order of angle of arrival to form an ordered list of user equipments;
    d) subdividing the ordered list into a plurality of ordered sub-lists of user equipments in order of angle of arrival; and
    e) sequentially transmitting simultaneously on each of the plurality of beams to groups of each respective ordinal member of each sub-list of user equipments, respectively.

2. A method as claimed in claim 1, wherein the step of sorting the identifiers further comprises determining a carrier to interference and noise ratio for each user equipment; comparing the ratio with one or more predetermined values of the ratio and where the ratio is below one or more of the predetermined values placing the identifier one or more additional times in the ordered list respectively, such that transmissions take place to such user equipments one or more additional times compared with user equipments having ratios above the one or more predetermined values.

3. A method as claimed in claim 1, wherein the step of determining angles of arrival comprises subdividing a sector addressed by the antenna array into a plurality of contiguous equal angle of arrival ranges and assigning each of the user equipments to an angle of arrival range in which the user equipment angle of arrival most probably lies.

4. A method as claimed in claim 3, wherein the step of assigning each of the user equipments comprises determining a correlation between a spatial signature received at the array from a user equipment and a plurality of plane waves of different angles of arrival and assigning the user equipment to an angle of arrival of a plane wave having a highest correlation with the spatial signature received.

5. A method as claimed in claim 1, wherein the steps of determining, and storing at the transmitter, angles of arrival of signals and identifiers from a plurality of user equipments comprises assigning sets of substantially orthogonal Grassmannian vectors to the antenna array and vector-quantizing spatial signals received at the array from the plurality of user equipments to a nearest Grassmannian vector; the steps of sorting the identifiers of the user equipments in order of arrival to form an ordered list of user equipments and subdividing the ordered list into a plurality of ordered sub-lists of user equipments in order of angle of arrival comprises forming sub-lists of the identifiers associated with each of the nearest Grassmannian vectors; and the step of sequentially transmitting simultaneously to a group of user equipments comprises simultaneously transmitting to respective ordinal members of sub-lists of user equipments associated with sets of substantially orthogonal Grassmannian vectors.

6. A method as claimed in claim 5, wherein the step of forming sub-lists of the identifiers associated with each of the nearest Grassmannian vectors further comprises determining a carrier to interference and noise ratio for each user equipment; comparing the ratio with one or more predetermined values of the ratio and where the ratio is below one or more of the predetermined values placing the identifier one or more additional times in the sub-list respectively, such that transmissions take place to such user equipments one or more additional times compared with user equipments having ratios above the one or more predetermined values.

7. A space division multiple access scheduling apparatus comprising:
    a) receiving means for receiving signals and identifiers from a plurality of user equipments;

b) processing means for determining angles of arrival of the signals received from the plurality of user equipment; for sorting the identifiers of the user equipments in order of angle or arrival to form an ordered list of user equipments; and for subdividing the ordered list into a plurality of ordered sub-lists of user equipments in order of angle of arrival; and c) transmitter means having antenna array means for producing a plurality of beams for sequentially transmitting simultaneously on each of the plurality of beams to groups of each respective ordinal member of each sub-list of user equipments, respectively.

8. An apparatus as claimed in claim 7, wherein the processing means is arranged for determining a carrier to interference and noise ratio for each user equipment; comparing the ratio with one or more predetermined values of the ratio and where the ratio is below one or more of the predetermined values placing the identifier one or more additional times in the ordered list respectively, such that transmissions take place to such user equipments one or more additional times compared with user equipments having ratios above the one or more predetermined values.

9. An apparatus as claimed in claim 7, wherein the processing means is arranged for subdividing a sector addressed by the antenna array into a plurality of contiguous equal angle of arrival ranges and for assigning each of the user equipments to an angle of arrival range in which the user equipment angle of arrival most probably lies.

10. An apparatus as claimed in claim 9, wherein the processing means comprises correlation means for determining a correlation between a spatial signature received at the array from a user equipment and a plurality of plane waves of different angles of arrival and assigning the user equipment to an angle of arrival of a plane wave having a highest correlation with the spatial signature received.

11. An apparatus as claimed in claim 7, wherein the processing means is arranged for assigning Grassmannian vectors to the antenna array and vector-quantizing spatial signals received at the array from the plurality of user equipments to a nearest Grassmannian vector to form the sub-lists and the transmitter means is arranged for sequentially transmitting simultaneously to a group comprises simultaneously transmitting to user equipments associated with substantially orthogonal Grassmannian vectors.

12. An apparatus as claimed in claim 11, wherein the processing means is arranged for determining a carrier to interference and noise ratio for each user equipment; comparing the ratio with one or more predetermined values of the ratio and where the ratio is below one or more of the predetermined values placing the identifier one or more additional times in a respective sub-list, such that transmissions take place to such user equipments one or more additional times compared with user equipments having ratios above the one or more predetermined values.

13. A space division multiple access scheduling apparatus comprising:

a) a receiver for receiving signals and identifiers from a plurality of user equipments;

b) a processor for determining angles of arrival of the signals received from the plurality of user equipments; for sorting the identifiers of the user equipments in order of angle of arrival to form an ordered list of user equipments; and for subdividing the ordered list into a plurality of ordered sub-lists of user equipments in order of angle of arrival; and c) a transmitter having an antenna array for producing a plurality of beams for sequentially transmitting simultaneously on each of the plurality of beams to groups of each respective ordinal member of each sub-list of user equipments, respectively.

14. An apparatus as claimed in claim 13, wherein the processor is arranged for determining a carrier to interference and noise ratio for each user equipment; comparing the ratio with one or more predetermined values of the ratio and where the ratio is below one or more of the predetermined values placing the identifier one or more additional times in the ordered list respectively, such that transmissions take place to such user equipments one or more additional times compared with user equipments having ratios above the one or more predetermined values.

15. An apparatus as claimed in claim 13, wherein the processor is arranged for subdividing a sector addressed by the antenna array into a plurality of contiguous equal angle of arrival ranges and for assigning each of the user equipments to an angle of arrival range in which the user equipment angle of arrival most probably lies.

16. An apparatus as claimed in claim 14, wherein the processor comprises a correlator for determining a correlation between a spatial signature received at the array from a user equipment and a plurality of plane waves of different angles of arrival and assigning the user equipment to an angle of arrival of a plane wave having a highest correlation with the spatial signature received.

17. An apparatus as claimed in claim 13, wherein the processor is arranged for assigning Grassmannian vectors to the antenna array and vector-quantizing spatial signals received at the array from the plurality of user equipments to a nearest Grassmannian vector to form the sub-lists and the transmitter is arranged for sequentially transmitting simultaneously to a group comprises simultaneously transmitting to user equipments associated with substantially orthogonal Grassmannian vectors.

18. An apparatus as claimed in claim 17, wherein the processor is arranged for determining a carrier to interference and noise ratio for each user equipment; comparing the ratio with one or more predetermined values of the ratio and where the ratio is below one or more of the predetermined values placing the identifier one or more additional times in a respective sub-list, such that transmissions take place to such user equipments one or more additional times compared with user equipments having ratios above the one or more predetermined values.

19. A base station comprising a space division multiple access apparatus as claimed in claim 13.

20. A network comprising a space division multiple access apparatus as claimed in claim 13.

21. A random transmit beam system comprising optimally packed beams formed by the method of claim 1.

22. Computer executable software code stored on a computer readable medium, the code being for space division multiple access scheduling comprising the steps of:

a) providing a transmitter having an antenna array with a plurality of beams;

b) determining, and storing at the transmitter, angles of arrival of signals and identifiers from a plurality of user equipments;

c) sorting the identifiers of the user equipments in order of angle of arrival to form an ordered list of user equipments;

d) subdividing the ordered list into a plurality of ordered sub-lists of user equipments in order of angle of arrival; and e) sequentially transmitting simultaneously to each ordinal member of each sub-list of user equipments.

23. A programmed computer for space division multiple access scheduling comprising the steps of:
   a) providing a transmitter having an antenna array with a plurality of beams;
   b) determining, and storing at the transmitter, angles of arrival of signals and identifiers from a plurality of user equipments;
   c) sorting the identifiers of the user equipments in order of angle of arrival to form an ordered list of user equipments;
   d) subdividing the ordered list into a plurality of ordered sub-lists of user equipments in order of angle of arrival; and
   e) sequentially transmitting simultaneously to each ordinal member of each sub-list of user equipments.

* * * * *

UNITED STATES PATENT AND TRADEMARK OFFICE
CERTIFICATE OF CORRECTION

| | | |
|---|---|---|
| PATENT NO. | : 7,620,019 B1 | Page 1 of 1 |
| APPLICATION NO. | : 10/928454 | |
| DATED | : November 17, 2009 | |
| INVENTOR(S) | : Smith et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1143 days.

Signed and Sealed this

Twenty-sixth Day of October, 2010

David J. Kappos
*Director of the United States Patent and Trademark Office*